(12) United States Patent
Kourkoulos et al.

(10) Patent No.: US 10,860,768 B1
(45) Date of Patent: Dec. 8, 2020

(54) THROUGH SILICON VIAS TO INTERCONNECT ELECTRICAL PARASITIC EXTRACTION

(71) Applicant: Mentor Graphics Corporation, Wilsonville, OR (US)

(72) Inventors: Vasileios Kourkoulos, Portland, OR (US); Georgios Manetas, Grenoble (FR)

(73) Assignee: Mentor Graphics Corporation, Wilsonville, OR (US)

( * ) Notice: Subject to any disclaimer, the term of this patent is extended or adjusted under 35 U.S.C. 154(b) by 1 day.

(21) Appl. No.: 16/147,727

(22) Filed: Sep. 29, 2018

(51) Int. Cl.
| | |
|---|---|
| *G06F 30/00* | (2020.01) |
| *G06F 30/367* | (2020.01) |
| *G06F 30/327* | (2020.01) |
| *G06F 30/392* | (2020.01) |
| *H01L 23/48* | (2006.01) |
| *H01L 23/522* | (2006.01) |
| *G06F 119/12* | (2020.01) |

(52) U.S. Cl.
CPC ......... *G06F 30/367* (2020.01); *G06F 30/327* (2020.01); *G06F 30/392* (2020.01); *G06F 2119/12* (2020.01); *H01L 23/481* (2013.01); *H01L 23/5222* (2013.01)

(58) Field of Classification Search
CPC .............. G06F 17/5036; G06F 17/505; G06F 17/5072; G06F 2217/84; H01L 23/481; H01L 23/5222
See application file for complete search history.

(56) References Cited

U.S. PATENT DOCUMENTS

| | | | | |
|---|---|---|---|---|
| 6,834,380 B2 * | 12/2004 | Khazei | ............... | G06F 17/5036 703/13 |
| 7,454,733 B2 * | 11/2008 | Alon | .................. | G06F 17/5036 703/14 |
| 8,146,032 B2 * | 3/2012 | Chen | ................... | G06F 17/5036 716/106 |
| 8,214,788 B2 * | 7/2012 | Suaya | ................ | G06F 17/5036 716/136 |

(Continued)

OTHER PUBLICATIONS

Xu et al.; "A Fully Analytical Model for the Series Impedance of Through-Silicon Vias with Consideration of Substrate Effects and Coupling with Horizontal Interconnects"; EEE Transactions on electron devices; vol. 58; No. 10; Oct. 2011; pp. 3529-3540.*

(Continued)

*Primary Examiner* — Naum Levin

(57) ABSTRACT

Disclosed herein are embodiments of tools and techniques for computing the electric coupling in terms of parasitic admittance and capacitance values between a through silicon via (TSV) and surrounding interconnect of an integrated circuit layout design. In particular embodiments, a computation of one or more admittance and capacitance values between a through-silicon-via (TSV) structure and an interconnect structure of the three-dimensional integrated circuit layout design using two or more field solvers or rule-based engines that are different from one another is performed. In addition, electrical connectivity for the coupling parasitic between a TSV and an interconnect is established. Then, a parasitic netlist representation of the three-dimensional integrated circuit layout design that includes the above parasitic element values is generated.

19 Claims, 41 Drawing Sheets

(56) References Cited

U.S. PATENT DOCUMENTS

| | | | |
|---|---|---|---|
| 8,352,232 B2 * | 1/2013 | Han | G06F 17/5036 703/13 |
| 8,448,115 B1 * | 5/2013 | Kourkoulos | G06F 17/5036 716/111 |
| 8,495,532 B2 * | 7/2013 | Su | G06F 17/5036 716/101 |
| 8,504,962 B1 * | 8/2013 | Kourkoulos | G06F 17/5036 716/110 |
| 8,607,179 B2 * | 12/2013 | Wu | G06F 17/5036 716/106 |
| 9,633,149 B2 * | 4/2017 | Yen | G06F 17/5036 |
| 9,767,235 B2 * | 9/2017 | Guedon | G06F 17/5018 |
| 9,886,542 B2 * | 2/2018 | Han | G06F 17/5081 |
| 2010/0094609 A1 * | 4/2010 | Han | G06F 17/5036 703/14 |
| 2016/0034633 A1 * | 2/2016 | Han | G06F 17/5081 716/115 |

OTHER PUBLICATIONS

Xu et al.; "Compact AC modeling and performance analysis of through-silicon vias in 3-D ICs"; EEE Transactions on electron devices; vol. 57; No. 12; Dec. 2010; pp. 3405-3417.*

Dieng et al.; "Modeling and Frequency Performance Analysis of Through Silicon Capacitors in Silicon Interposers"; EEE Transactions on components, packaging and manufacturing technology; vol. 7; No. 4; Apr. 2017; pp. 477-484.*

Aksun, "A Robust Approach for the Derivation of Closed-Form Green's Functions," IEEE Trans. Microw. Theory Tech., vol. 44, pp. 651-658 (May 1996).

Kao et al., "Parasitic extraction: current state of the art and future trends," IEEE, vol. 89, Issue 5, pp. 729-739 (May 2001).

Kourkoulos et al., "Through Silicon via Admittance Field Solver with System Level Capacity: Theory," Signal and Power Integrity Workshop, 4 pp. (May 2013).

* cited by examiner

FIG. 7
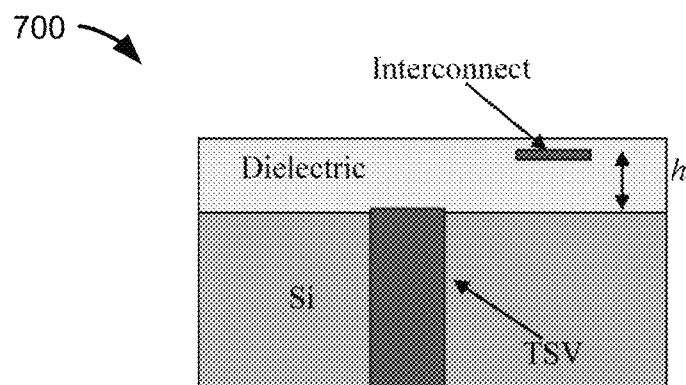
a) Cross-section view
FIG. 7A
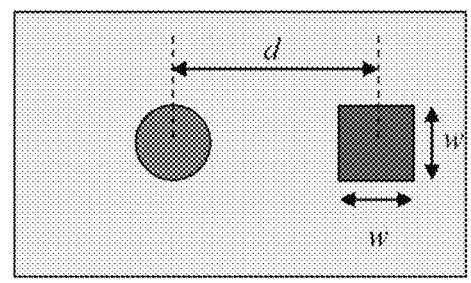
b) Top view
FIG. 7B

900

1000

1100

1300 ⤴

1600

THROUGH SILICON VIAS TO INTERCONNECT ELECTRICAL PARASITIC EXTRACTION

FIELD

This application concerns tools and techniques for performing parasitic extraction. Such parasitic extraction is performed as part of the design circuit verification, and/or manufacture flow of integrated circuits.

SUMMARY

Disclosed herein are embodiments of tools and techniques for computing the admittance coupling between a through silicon via (TSV) and surrounding interconnect of an integrated circuit layout design. The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

The foregoing and other objects, features, and advantages of the disclosed technology will become more apparent from the following detailed description, which proceeds with reference to the accompanying figures.

BRIEF DESCRIPTION OF THE DRAWINGS

FIG. 2 includes the dielectrics and metal bodies above the substrate as well as the projections of the interconnects on the substrate.

FIGS. 7(A) and (B) are schematic block diagrams illustrating the structure of one example TSV inside the silicon substrate.

DETAILED DESCRIPTION

I. General Considerations

Figure 1:
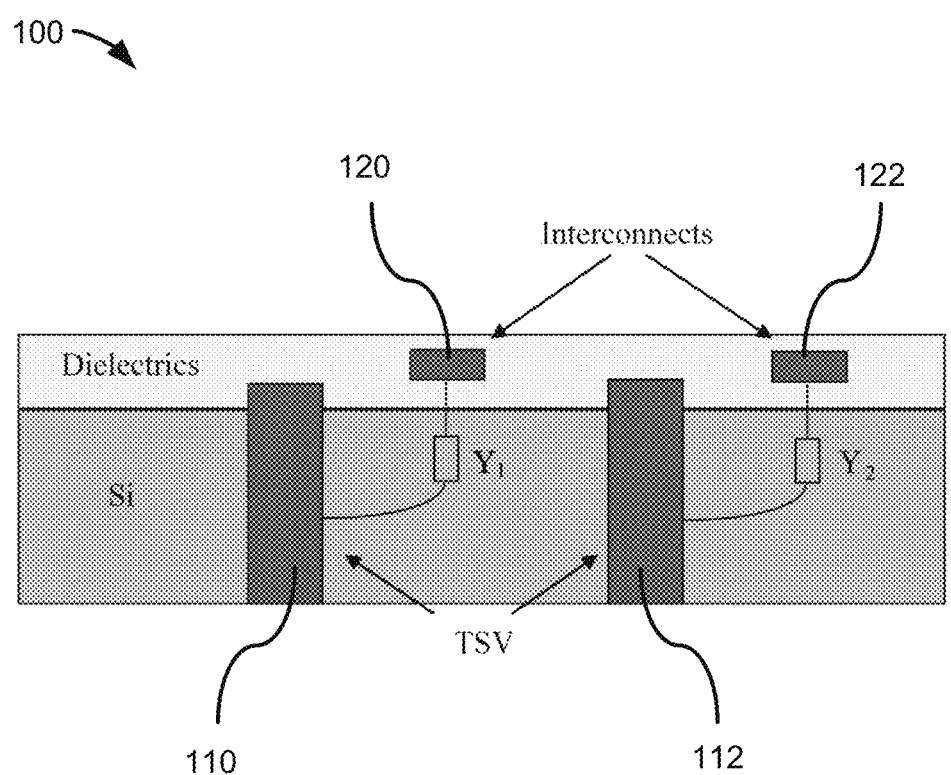
FIG. 1 is a schematic block diagram that illustrates the cross-section view of a structure for a three-dimensional integrated circuit with two TSVs inside the silicon substrate and two interconnects.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "generate," "receive," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Some of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as computer-readable instructions executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to Disclosed Technology

II.A. Overview

Disclosed herein are embodiments of tools and techniques for computing the admittance coupling (corresponding to a complex value involving a capacitive and conductive part) between a through silicon via (TSV) and surrounding interconnect. This admittance coupling is also referred to herein as "TIAC".

The computation of the TIAC is a desirable part of the parasitic extraction process during the circuit verification of three-dimensional integrated circuits designs (3D-ICs). One of the main reasons for this is that the capacitive ground for some 3D-IC's (e.g., an interposer) has not been previously well defined. In a 3D-IC, the TSVs act as the capacitive ground for the classical interconnects and vice versa. If the TIAC is not netlisted, a parasitic extraction engine is forced to use an alternative physical ground for the structure (usually the top of the substrate for the interconnect parasitic and the bottom of the substrate for the TSV), which can significantly penalize accuracy and produce unreliable results.

II.B. Example Embodiments of the Disclosed Technology

The disclosed technology addresses problems in the accurate simulation of three-dimensional integrated circuits (3D-ICs) that, without proper consideration, would hinder the manufacture and development of such 3D-IC structures. For example, the disclosed technologies provide numerous embodiments that: (a) address inaccuracies in previous approaches to computing real-world parasitic effects experienced between a TSV and a neighboring interconnect; (b) improve computational efficiency in computing those real-world parasitic effects; (c) reduce the memory burden experienced by computing devices computing those real-world parasitic effects; (d) reduce the power burden experienced by computing devices computing those real-world parasitic effects; (e) present new and improved approaches that more accurately and efficiently compute the parasitic effect problem; and/or (f) present new and improved approaches to computing the parasitic effect problem using unconventional techniques that are not part of any conventional computer module or routine.

A typical 3D-IC structure includes one or more TSVs which are transverse to the substrate and can project above the substrate into the metal layers. For example, FIG. 1 is a schematic block diagram 100 that illustrates an example structure with two TSVs (TSV 110 and TSV 112) inside the silicon substrate, but also extending into the dielectric substrate. To represent the admittance coupling between each of the TSVs with neighboring interconnects, the respective TIACs are denoted with the letter "Y": $Y_1$ and $Y_2$.

In general, TIAC is a quantity that is highly frequency dependent, and in principle, its solution poses an electro quasi static problem. Accordingly, it is also desirable for embodiments of the disclosed technology to address the issue of netlisting this quantity.

In the subsections below, an example methodology is described involving the decomposition of the problem into two problems, which can be treated separately. The first problem is an electrostatic ("ES") capacitance problem. The second problem involves an electro quasi-static ("EQS") problem. In particular embodiments, the solution of the second problem uses an electro quasi-static ("EQS") capacitance engine to generate the desired netlist values. Sometimes, in the discussion below, references to "capacitance", refer to a complex quantity, denoted by C, whose real part is related to the real capacitance and the imaginary part is related to the conductance. For the ES capacitance problem the real and the complex capacitance are the same. In this application, references to "admittance" refer to a complex quantity which is denoted as Y and it is related to capacitance through the equation $Y=j2\pi fC$, where j denotes the imaginary unit, and f the frequency of operation.

II.B.1. Decomposition of the Problem

In accordance with representative embodiments of the disclosed technology, the structure illustrated in FIG. 1 can be decomposed into two structures.

Figure 2:
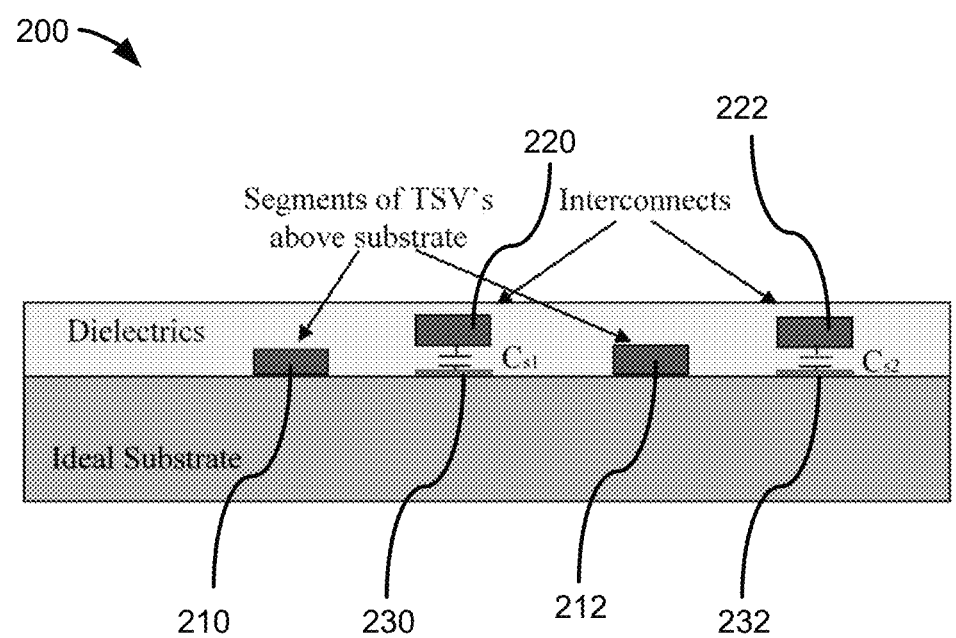
FIG. 2 is a schematic block diagram that illustrates the electro-static part of the structure corresponding to FIG. 1.

The first structure comprises the interconnects (e.g., all the interconnects) at the one side of the substrate, and has, as their capacitive ground, the closest interface to the substrate. This first structure also includes the projections of the interconnects to the substrate interface. This first structure is illustrated by schematic block diagram 200 of FIG. 2. In more detail, FIG. 2 includes the dielectric layer along with the metal bodies that extend above the substrate, including the interconnects (such as interconnect 220 and interconnect 222) and the portions of any TSVs that extend above the substrate (such as TSV segment 210 and TSV segment 212) as well as the projections of the interconnects on the substrate interface (such as projection 230 and 232). Because the substrate in FIG. 2 is considered a perfect conductor, this is an electro-static problem, since there are no semiconductive materials involved, and therefore the structure will be referred to as an electro static structure ("ESS"). This ESS problem can be computed using a variety of capacitance engines (e.g., any of the rule-based solution of Calibre like Calibre xRC or Calibre xACT or any of the field solver based solutions like Calibre xACT3D)).

Figure 3:
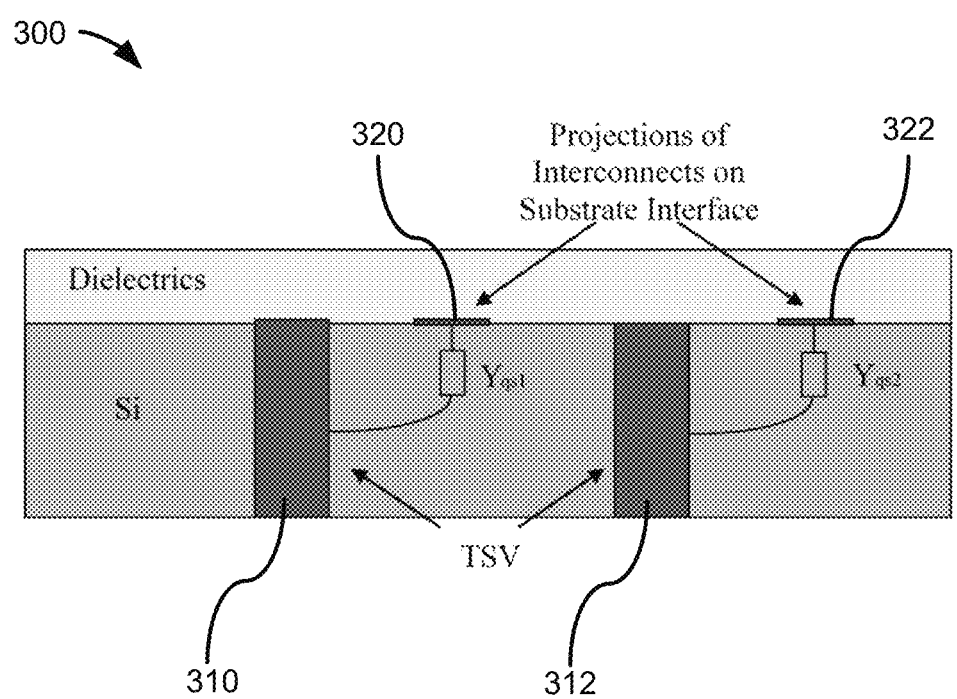
FIG. 3 is a schematic block diagram that illustrates the electro-quasi-static part of the structure of FIG. 1.

The second structure includes the elements (e.g., all the elements) inside the substrate (TSVs) and the projections of the classical interconnects outside of the substrate on the substrate interface. This second structure is illustrated by schematic block diagram 300 of FIG. 3. In particular, FIG. 3 illustrates the electro quasi-static part of the structure of FIG. 1. FIG. 3 includes the elements (e.g., all elements) inside the substrate, including TSVs (such as TSV 310 and TSV 312) and projections of the classical interconnects on the substrate interface (such as projection 320 and projection 322). Notably, the projections of the classical interconnects (such as projections 320, 322) will not necessarily have the same size as the original interconnects. Due to fringing effects, the projections are desirably larger than the original structures. This results in an EQS problem, because the substrate is a semi-conducting material, and therefore this structure will be referred to as an electro quasi-static structure ("EQSS"). In certain embodiments, the EQSS can be treated by a 3D field solver with certain enhancements, as described below.

In other embodiments, the EQSS (in a similar manner as already mentioned for ESS) can be treated using a rule-based engine. A rule-based capacitance engine includes a first step whereby, for a set of predefined interconnect patterns, capacitance parasitic are extracted using a field solver or analytical mathematic formulas. A library of capacitance values associated with different values of the pattern geometrical configurations is generated. In addition, closed-form mathematical expressions for capacitance based on the available numerical data and curve-fitting techniques may also be generated. The set of predefined interconnect patterns and the stack of surrounding dielectric medium depend on the specific foundry technology on which the IC design of interest will be fabricated. During the parasitic extraction step for an IC design, the rule-based engine associates actual patterns in the design layout with those pre-characterized in the library and extracts capacitance values through table look-up and closed-form expression calculations. See, e.g., Kao, W. H.; Chi-Yuan Lo; Basel, M.; Singh, R., "Parasitic extraction: current state of the art and future trends", Proceedings of the IEEE, vol. 89, issue 5, p. 729-739.

It should be understood that FIG. 1 and the decomposition described above is by way of example and that the decomposition of the problem may vary based on the particular structure. For example, if interconnects (both above and below the substrate) were present, the problem could be broken down into three problems: (a) a first ES problem for the interconnect above the substrate and projection of that interconnect at the top substrate interface; b) a second ES problem for the interconnect below the substrate and the projection of that interconnect to the bottom interface of the substrate; and (c) a EQS problem for the TSV inside the substrate and the aforementioned projections at the bottom and top interface of the substrate. A similar analysis can be applied for any structure depending on how many ESS and EQSS interfaces are present.

Figure 4:
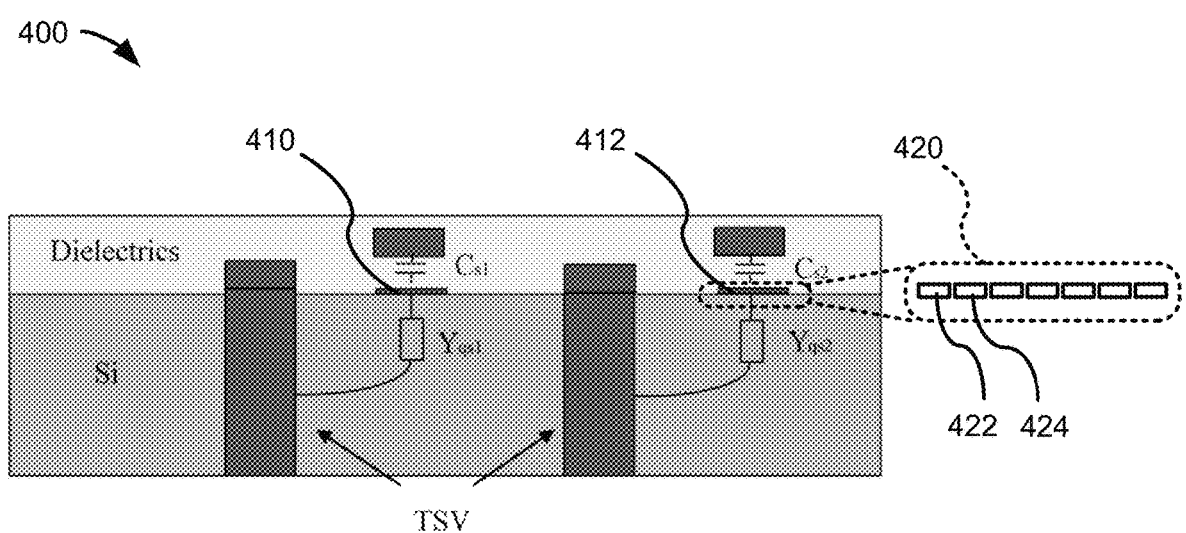
FIG. 4 is a schematic block diagram illustrating the connection points for a parasitic netlist corresponding to FIG. 1, where the electro-static structure and the electro-quasi-static structure are joined by nodes corresponding to the projections of the classical interconnects to the substrate interface.

In the following paragraphs, the generation of a parasitic netlist for the whole structure is discussed. As mentioned above, an electro-static capacitance engine can compute the capacitances of FIG. 2, generating the netlist for the ESS. The admittances illustrated by FIG. 3 are frequency dependent, and can be addressed by an EQS engine, which in turn would compute the parasitic netlist for the EQSS. A remaining issue is how two parasitic netlists (one for ESS and one for EQSS) can be connected to each other, to form the combined netlist for the whole structure. In FIG. 4, an example technique for connecting the two parasitic netlitsts is illustrated. In particular, FIG. 4 is a schematic block diagram 400 showing connection points (e.g., connection point 410 and connection point 412) for the two netlists of the ESS and the EQSS structure. In the illustrated embodiment, the connection points are illustrated as nodes at the boundary of the ESS and EQSS structures. The nodes correspond to the projections of the classical interconnects to the substrate interface. Further, the capacitors for the classical interconnects (e.g., $C_{s1}$ and $C_{s2}$) are connected to the nodes corresponding to the projections of the classical interconnect to the substrate interface. In this paragraph, the generation of the projections of the classical interconnects is discussed. In certain embodiments, the projections of the classical interconnects could be generated by projecting the polygons corresponding to all the classical interfaces onto the substrate and merging the overlapping polygons (by using Calibre layer operations). In certain embodiments, this projections could be further discretized in order to increase accuracy (as it is demonstrated in FIG. 4 where the segment 412/420 has been decomposed into smaller segments, like 422 and 424). The finer the discretization is, the higher the accuracy is. In certain embodiments the projections could also be expanded (by using Calibre layer operations) in order to account for capacitive fringing effects.

The decomposition of the original structure to the structures EES and EQSS has multiple benefits, including one or more of: (a) a modular implementation; (b) the reduction of a complex problem into smaller, simpler problems, thereby resulting in significant increases in speed (for instance, the reduced problem size reduces the memory requirements for the computation and facilitates caching); (c) the generation of a parasitic netlist for the TIAC that is computationally more efficient (e.g., because of the aforementioned decomposition); and/or (d) the generation of a frequency independent netlist for the TIAC that is more accurate, thereby resulting in an improvement to the technical field of parasitic extraction during the circuit verification stage of integrated circuit development.

Figure 5:
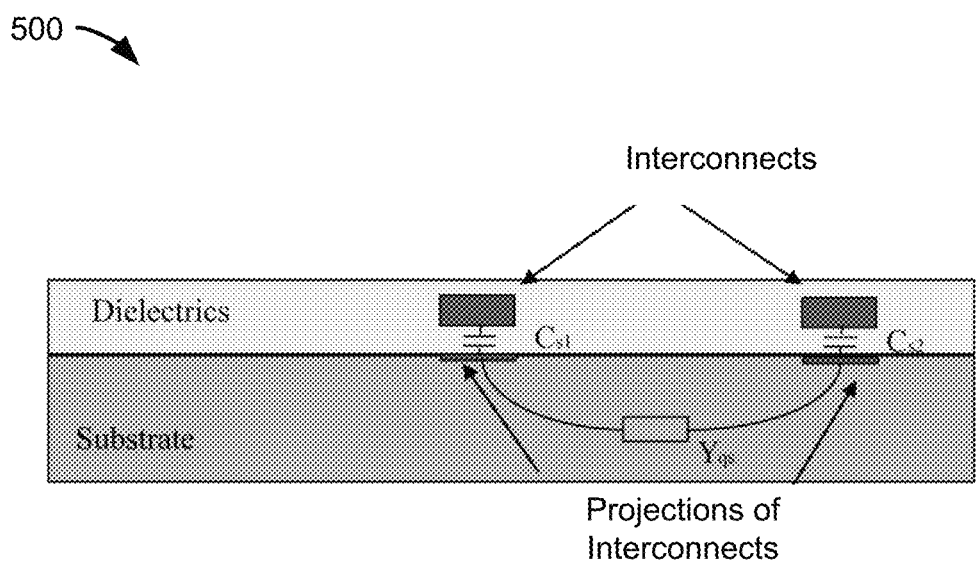
FIG. 5 is a schematic block diagram illustrating a special case of the TSV/interconnect admittance coupling functionality, where no TSVs are present to the layout.

It should also be noted that, in the case of no TSVs being present in the layout, the disclosed decomposition can be considered a methodology for the calculation of substrate coupling between interconnects, as illustrated in FIG. 5. In particular, FIG. 5 is a schematic block diagram 500 that illustrates a special case of the TIAC functionality, where no TSVs are present to the layout. The technique thus can be used to perform substrate coupling for any situation where such coupling is desirable.

II.B.2. Solution of the EQS Problem

II.B.2.a. Unknowns and MoM Equations

Certain embodiments of the disclosed technology employ a solution to the EQS problem that modifies the solution presented in V. Kourkoulos, and R. Suaya, "Through Silicon Via Field Solver with System Level Capacity: Theory", in *Signal and Power Integrity Workshop*, Paris (May 2013) ("Kourkoulos I"). In particular, embodiments of the disclosed technology use a unique treatment of the projections of the interconnects (PIs). In this section, the advancements over Kourkoulos I are described that allow the technology to account for the PIs. In the disclosed embodiments, the voltages on the PIs are considered given (conductors). However, for simplicity (and to keep the method of moments ("MoM") matrix symmetric), it will be assumed unknown. The charge on the PIs (or since there is a one-on-one correspondence the displacement of the electric field) is unknown. Keeping the above in mind, the following equations are used in embodiments of the disclosed technology (which are modifications to equations 8 and 9 of Kourkoulos I):

$$\Phi(\vec{r}) = \sum_{n=1}^{N} \Phi_n B_n^{\Phi}(\vec{r}), \vec{r} \in (S_c \cup S_i \cup S_d \cup S_{PI}), \quad (1)$$

$$\vec{D}(\vec{r}) = \sum_{n=1}^{N} D_n \vec{B}_n^{D}(\vec{r}), \vec{r} \in (V_i \cup V_d \cup S_{PI}), \quad (2)$$

where $S_c$, $S_i$, $S_d$, $S_{PI}$ corresponds to the surface of the TSV, isolation region/depletion region interface, depletion region/substrate interface and PI's, respectively; $V_i$, $V_d$ the volume of the isolation region and depletion region respectively; $\Phi(\vec{r})$, $B_n^{\Phi}(\vec{r})$ and $\Phi_n$ represent the potential, the basis function used to the discretize the potential and the coefficient of the potential basis function respectively; $\vec{D}(\vec{r})$, $\vec{B}_n^{D}(\vec{r})$, $D_n$, represent the electric field displacement, the electric field displacement basis functions, and the coefficient of the electric field displacement basis function, respectively.

The MoM matrix presented in Kourkoulos I remains unchanged apart from equation (12) of Kourkoulos I, which is modified to:

$$\sum_{n=1}^{N} D_n \langle B_m^{\Phi}(\vec{r}), \langle K^{\Phi}(\vec{r}, \vec{r}'), \hat{n} \cdot B_n^{D}(\vec{r}') \rangle \rangle (\delta_{n,d} + \delta_{n,SI}) - \quad (3)$$

-continued $$\sum_{n=1}^{N} \Phi_n \langle B_m^\Phi(\vec{r}), B_n^\Phi(\vec{r}) \rangle = 0, B_m^\Phi \in (S_d \cup S_{PI}),$$

where $\delta_{n,SI}$ is equal to one if $B_n^D$ has finite support on $S_{PI}$, $K^\Phi(\vec{r}, \vec{r}')$ is the electro quasi static Greens Function for layered media. It should be noted that equation (3) corresponds to a set of equation with a number of equations increased by the number of the basis function for the voltages on the PIs in comparison to equation (12) of Kourkoulos I.

II.B.2.b. Discretization of Unknowns

For discretizing the unknown voltage and the unknown displacement field on the PI, embodiments of the disclosed technology use simple basis functions of the form:

$$B_n^\Phi(\vec{r}) = \begin{cases} 1, & \text{on surface of basis} \\ 0, & \text{otherwise} \end{cases}, \vec{r} \in S_{PI}, \quad (4)$$

$$\vec{B}_n^D(\vec{r}) = \begin{cases} 1 \cdot \hat{n}, & \text{on surface of basis} \\ 0, & \text{otherwise} \end{cases}, \vec{r} \in S_{PI}. \quad (5)$$

The use of the above basis functions implies that each one of the PIs will be discretized into a certain number of elements and each element will be assigned a basis functions. For each element, one can assign one basis function for the voltage and one basis function for the displacement. If this is done, the MoM matrix remains unchanged.

This discretization of the projection of the interconnect is illustrated at 420 where the projection of the interconnect is discretized into two or more elements (such as representative elements 422 and 424) that collectively form the projection. In particular embodiments, the two or more elements can be modelled as volume-less structure. By considering it as floating conductor, the projection provides a continuation of voltage between the ESS and the EQSS as well as the continuation of the normal component to the substrate of the electric field displacement. Justifying its use as the connection point between the ES netlist and the EQS netlist.

Figure 41:
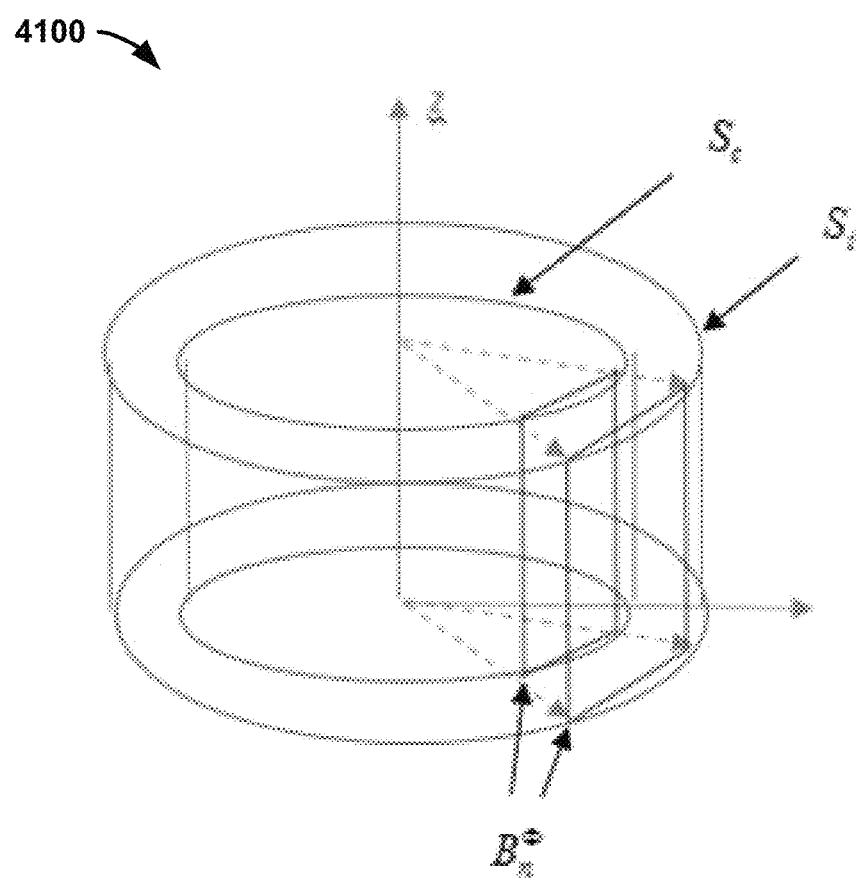
FIG. 41 is a schematic block diagram illustrating the basic function which could be used to represent the potential at the cylindrical surface of the TSV ($S_c$), or at the potential at the cylindrical surface of the isolation region ($S_i$).

For discretizing the unknown voltage and the unknown displacement field on the cylindrical surfaces, $S_c$, $S_i$, $S_d$, one may or may not use the basis functions of Kourkoulos I. For embodiments of the disclosed technology we can use piecewise constant functions outlined in figure YYY, and defined by the equations:

$$B_n^\Phi(\vec{r}) = \begin{cases} 1, & \text{on surface of basis} \\ 0, & \text{otherwise} \end{cases}, \quad (6)$$

$$\vec{B}_n^D(\vec{r}) = \begin{cases} \frac{\hat{\rho}}{\rho}, & \text{inside volume of basis} \\ 0, & \text{otherwise} \end{cases}, \quad (7)$$

where the surface of the potential basis function and the volume of the displacement basis function is described by in FIG. 41. The choice of equation (7) to describe the displacement electric field is based on the fact that such an expression will ensure that the divergence of the displacement electric field vector is zero inside the volume of the basis function as it should be, since we are referring to a dielectric material. In more detail, FIG. 41 is a schematic block diagram 4100 illustrating the basic function which could be used to represent the potential at the cylindrical surface of the TSV ($S_c$), or at the potential at the cylindrical surface of the isolation region ($S_i$). For simplicity, the even larger cylindrical surface corresponding to the depletion region ($S_c$) has been omitted. The basis functions for the potential $B_n^\Phi$ have finite support only on rectangular patches which try to approximate the cylindrical surface Sc, $S_i$, $S_d$. The basis functions for the displacement $\vec{B}_n^D$ have finite support inside the prism volume defined by the corresponding two potential basis functions.

II.B.2.c. Computation of the Elements of MoM Matrix

In the following paragraphs we are going to outline the computation of the elements of MoM matrix. The computation of the elements of the MoM which do not involve the first integral of (3) are trivial, and need not be mentioned here. In the remarks below, the computation of the following integral is outlined:

$$I = \left\langle B_m^\Phi(\vec{r}), \left\langle K^\Phi(\vec{r}, \vec{r}'), \hat{n} \cdot B_n^D(\vec{r}') \right\rangle \right\rangle, \quad (8)$$

Where the $\langle f, g \rangle$ denotes the integral of the scalar product of functions $f$ with $g$ over the surface or volume where these functions assume a non-zero value. The integral of equation 8 is in principle a 5 dimensional integral; one dimension because $K^\Phi$ is only known in integral form; two more dimensions because $\hat{n} \cdot B_n^D(\vec{r}')$ is a quantity that has two dimensional finite support; and two more dimension because $B_m^\Phi(\vec{r})$ has two dimensional support. A five dimensional numerical integration for the computation of the MoM elements could be extremely computationally expensive. In the following paragraphs several methodologies are proposed to reduce that dimensionality.

In the case where both basis and testing functions correspond to PIs, then the above integral reduces to the integration of the Green's function ("GF") over the surfaces of the basis and the testing. This could be done with use of the following procedure. The GF can be expressed in terms of exponentials with the use of the Discrete Complex Image Method ("DCIM") (see, e.g., M. I. Aksun, "A robust approach for the derivation of closed-form Green's functions", *IEEE Trans. Microw. Theory Tech.*, vol. 44, pp. 651-658, May 1996). Once this is done, the integral of (8) can be reduced to a summation of integrals which resemble very closely the integral of (8) in the case of free space. If the GF is similar to the free space GF, then the inner integral could be computed in closed form. After this point, the outer integral could be computed with use of numerical integration. The DCIM images can then be stored in a database, since they do not depend on the layout. This reduced the dimensionality of the integral from 5 down to 2.

In the case where at least $\hat{n} \cdot B_n^D(\vec{r}')$ of (8) is related to the TSV a similar optimization to the one proposed in Kourkoulos I, could be used to compute some of the inner integrals in closed form:

$$\int_{z_a}^{z_b} K^\Phi(|\vec{\rho} - \vec{\rho}'|, z, z') dz' = -\frac{j}{4} \sum_{k=1}^{K} r_k H_0^{(2)}(p_k |\vec{\rho} - \vec{\rho}'|), \quad (9)$$

for the case of $B_m^\Phi(\vec{r})$ corresponding to *PIs*

$$\int_{z_c}^{z_d} \int_{z_a}^{z_b} K^\Phi(|\vec{\rho} - \vec{\rho}'|, z, z') dz' dz = -\frac{j}{4} \sum_{k=1}^{K} r'_k H_0^{(2)}(p'_k |\vec{\rho} - \vec{\rho}'|), \quad (10)$$

for the case of $B_m^\Phi(\vec{r})$ corresponding to *TSVs*

In particular, the integrals of the equations (9) and (10) are expressed in terms of the summation of Hankel functions. In the case of where $B_m^{\Phi}(\vec{r})$ corresponds to a PI equation (9) can be used to reduce the dimensionality of the integral of equation (8) from 5 to 3. In the case of $B_m^{\Phi}(\vec{r})$ corresponds to a TSV, equation (10) can be used to reduce the dimensionality of the integral of equation (8) from 5 to 2. The aforementioned enhancements decompose the computation into simpler terms, increasing the computationally speed with which the computation can be performed, reducing the memory requirements for the computation, and/or reducing the overall power burden for computing the solution. Moreover, the computation is more accurate than previously possible.

Still further, the images (the pairs $r_k$, $p_k$, and the pairs $r_k'$, $p_k'$) do not depend on the layout and can be stored in a database, which further offers computation benefits.

In certain embodiments, in the case where the testing is related to TSVs and the basis is related to PIs, the integral is the dual to the previously presented equation where the testing is related to PIs and the basis is related to TSVs, since Galerkin testing is used and the MoM matrix is symmetric.

II.B.2.d. Correction Factor for the PIs

As mentioned above, the projections of the interconnects on the substrate can be made larger than the interconnects themselves (e.g., by a fixed amount or some percentage (such as 5%, 10%, 15%, or any other suitable enlargement factor) in order to account for fringing effects.

Figure 6:
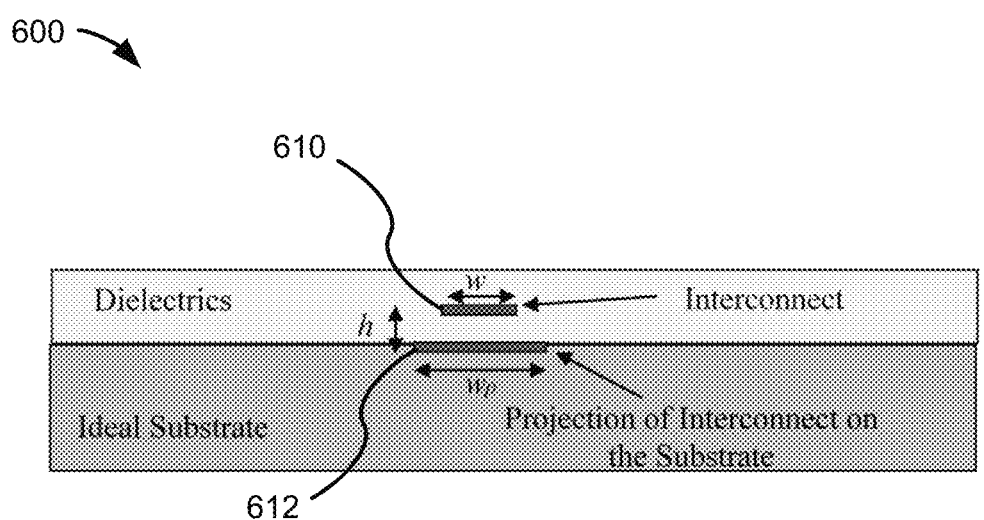
FIG. 6 is a schematic block diagram illustrating projections of the interconnects being of a larger size to account for fringing effects.

FIG. 6 is a schematic block diagram 600 illustrating such an enlargement scheme. In particular, schematic block diagram 600 shows an interconnect 610 and a projection 612 of the interconnect at the boundary of the substrate and the dielectric with the width of the projection 612 $w_p$ being expanded beyond the width of the interconnect w (which are separated from one another by height h).

In certain example implementations, a correction rule of the following form can be used:

$$W_p = W_t + f \cdot h, \quad (8)$$

For certain examples, for the correction factor f equal to 4, the accuracy was in the order of 3% for zeroth height interconnects. The factor f will vary from implementation to implementation. In certain examples, the factor f is a dependent factor—for example, dependent on the height h of the interconnect. For example, the factor f can be determined by one or more of: (a) manually developing an expression for the correction factor as a function of the height of the interconnect; and/or (b) creating an API that will create a table for the correction factor.

II.C. Numerical Results

In this section, numerical results from implementations of the disclosed technology are presented. For the study of accuracy, the focus was on an example structure comprising one TSV and one interconnect above the substrate, as illustrated in FIGS. 7A and 7B. In particular, FIG. 7A is a schematic block diagram 700 showing a cross-section of a structure comprising one TSV inside the silicon substrate and one interconnect, and block diagram 710 showing a cross-section top view of the same structure. In the figures below, the term "exact" refers to the full electro-quasi-static solution, and "approx." refers to an embodiment of the disclosed technology.

In this example, the substrate has conductivity equal to 6.667 S/m and a height of 50 μm. Above and below the substrate, the dielectric constant of 4.1 was assumed for example purposes. Further, the height of the TSV was assumed to be equal to the height of the substrate (50 μm), the oxide thickness was assumed to be equal to 0.3 μm with dielectric constant equal to 5.3, and the TSV was assumed to have the radius of 3 μm (including the oxide).

II.C.1. Accuracy Results—Effect of the Correction Coefficient on Accuracy

In this section, example results are reported for the projection of the interconnects on the substrate being corrected by a width of:

$$w_p = w + f \cdot h, \quad (9)$$

For the results presented, the following parameters were used: h=1 μm, w=5 μm, and d=20 μm. As will be seen in the next subsection, this is one of the average test-cases, as far as accuracy is concerned.

In FIGS. 8-16, the capacitance, the conductance, and the error of the complex capacitance are reported for the TSV, for the interconnect, and for the coupling capacitance. The exact results correspond to results taken without decomposing the problem.

Figure 8:
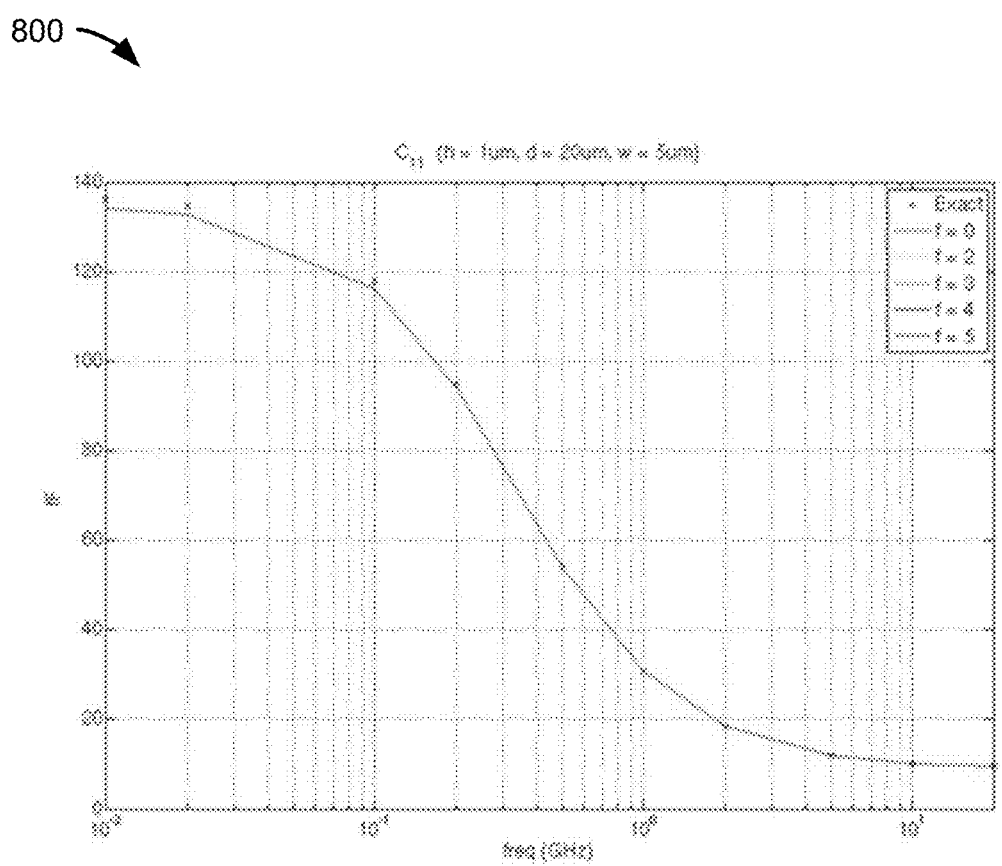
FIG. 8 is a graph showing the total real capacitance of TSV as a function of frequency for different correction factors.

FIG. 8 is a graph 800 showing the total capacitance of TSV as a function of frequency.

Figure 9:
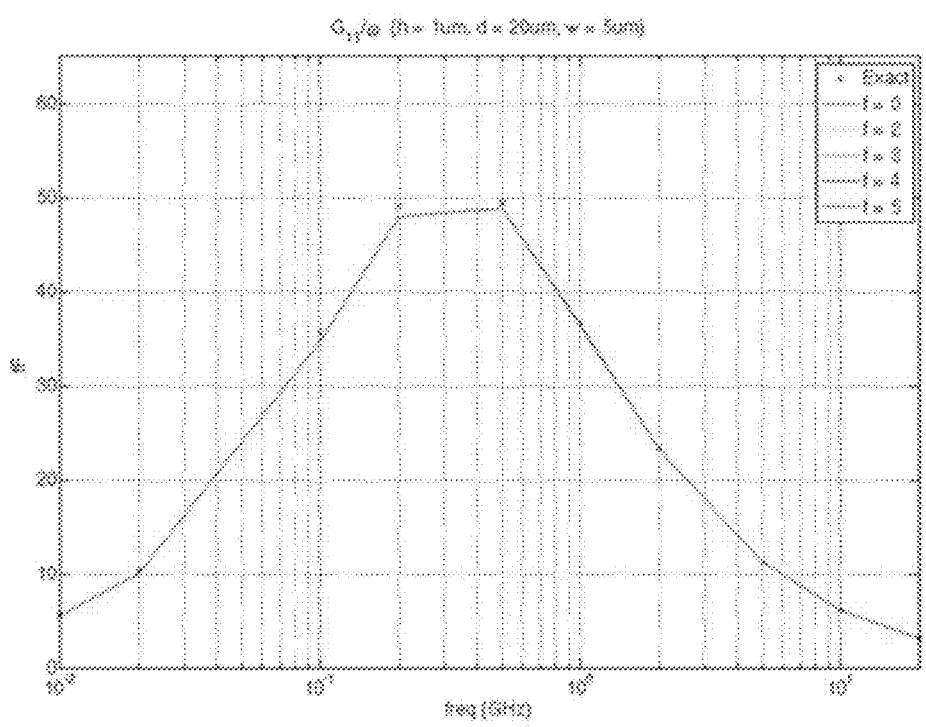
FIG. 9 is another graph showing the total conductance of TSV as a function of frequency for different correction factors.

FIG. 9 is another graph 900 showing the total conductance of TSV as a function of frequency.

Figure 10:
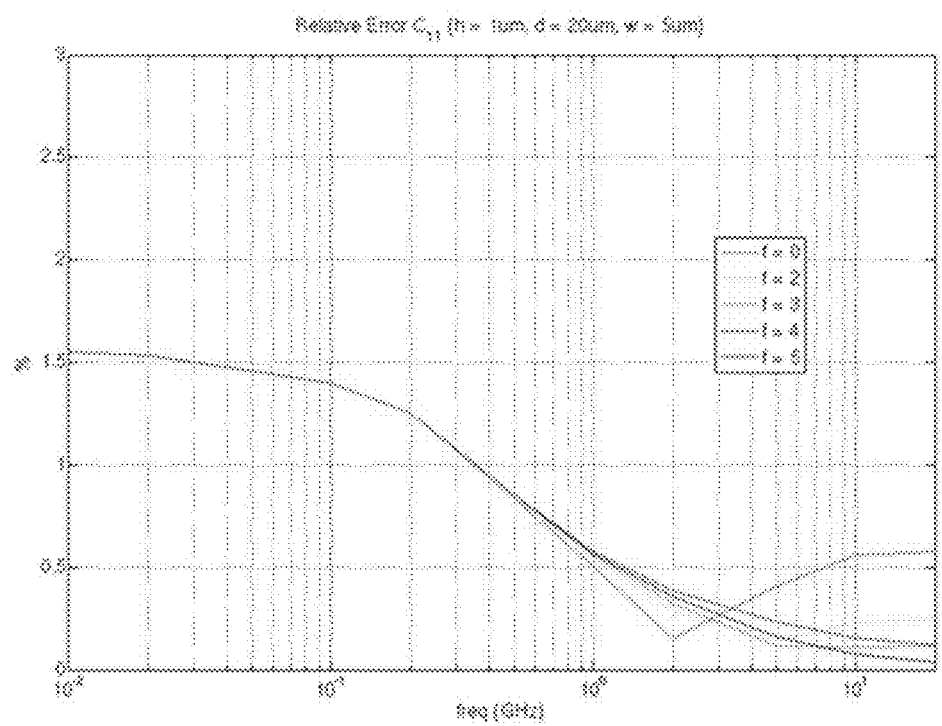
FIG. 10 is a graph showing the error of the complex total capacitance for the TSV as a function of frequency, for different correction factors.

FIG. 10 is a graph 1000 showing the error of the complex total capacitance for the TSV as a function of frequency for different correction factors.

Figure 11:
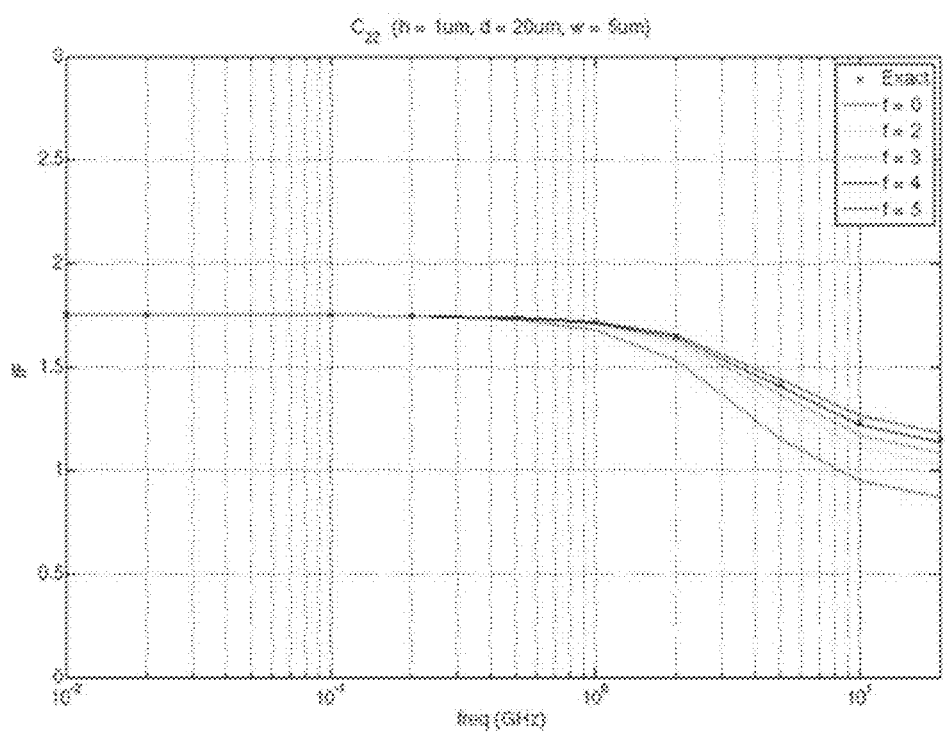
FIG. 11 is a graph showing the total real capacitance of interconnect as a function of frequency, for different correction factors.

FIG. 11 is a graph 1100 showing the total capacitance of interconnect as a function of frequency.

Figure 12:
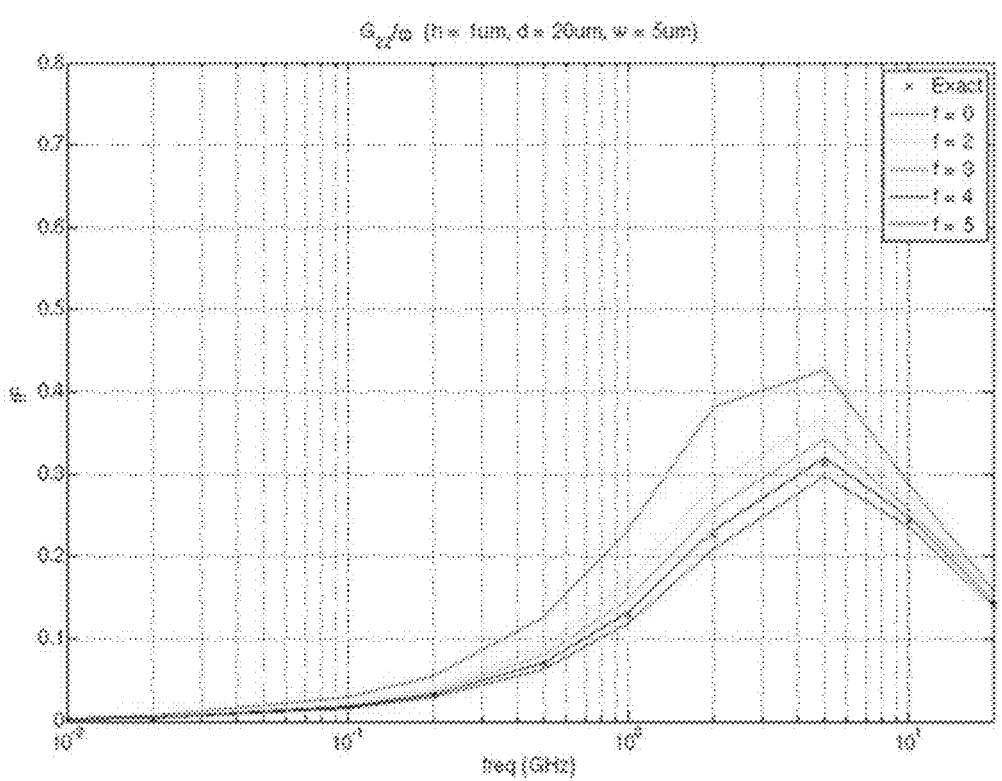
FIG. 12 is a graph showing the total conductance of interconnect as a function of frequency, for different correction factors.

FIG. 12 is a graph 1200 showing the total conductance of interconnect as a function of frequency.

Figure 13:
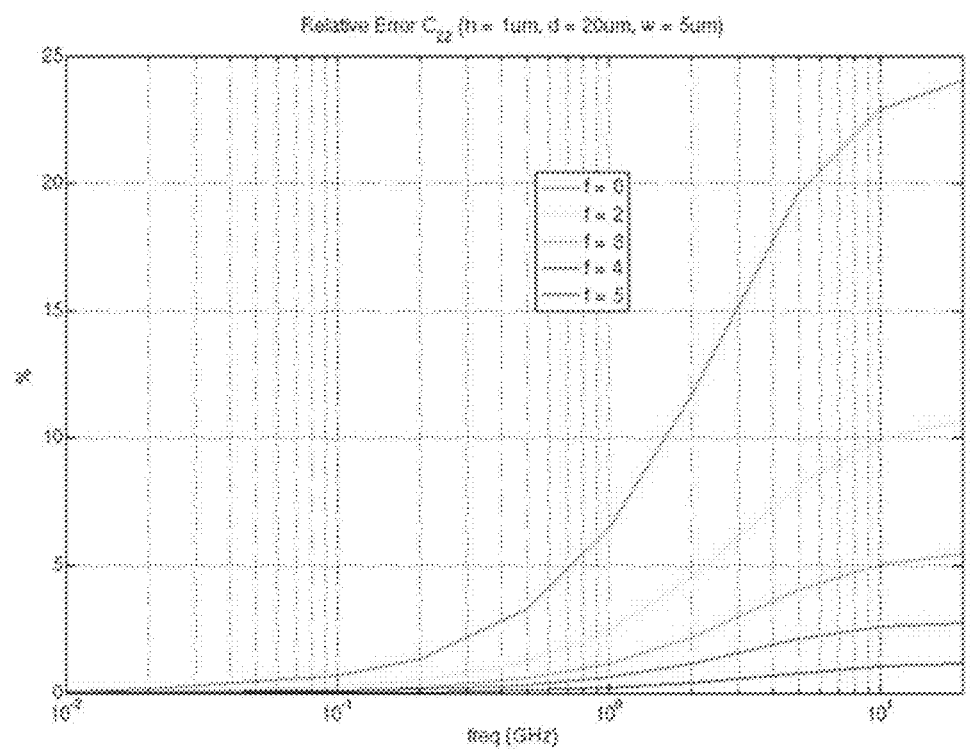
FIG. 13 is a graph showing error of the complex total capacitance for the interconnect as a function of frequency for different correction factors.

FIG. 13 is a graph 1300 showing error of the complex total capacitance for the interconnect as a function of frequency for different correction factors.

Figure 14:
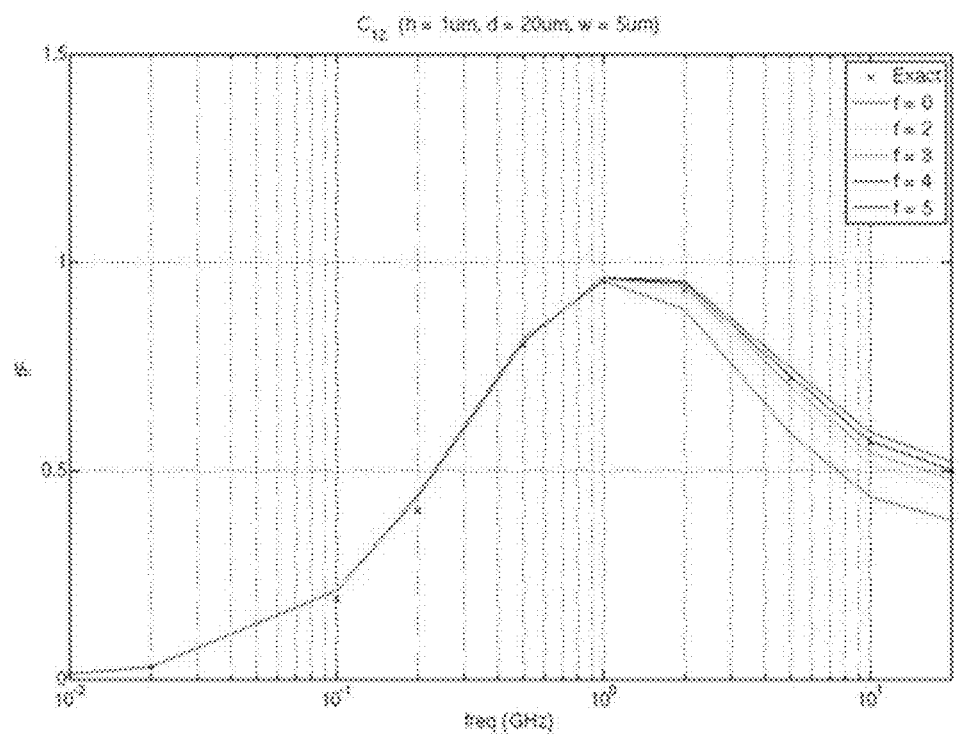
FIG. 14 is a graph showing the coupling real capacitance between TSV and interconnect as a function of frequency for different correction factors.

FIG. 14 is a graph 1400 showing the coupling capacitance between TSV and interconnect.

Figure 15:
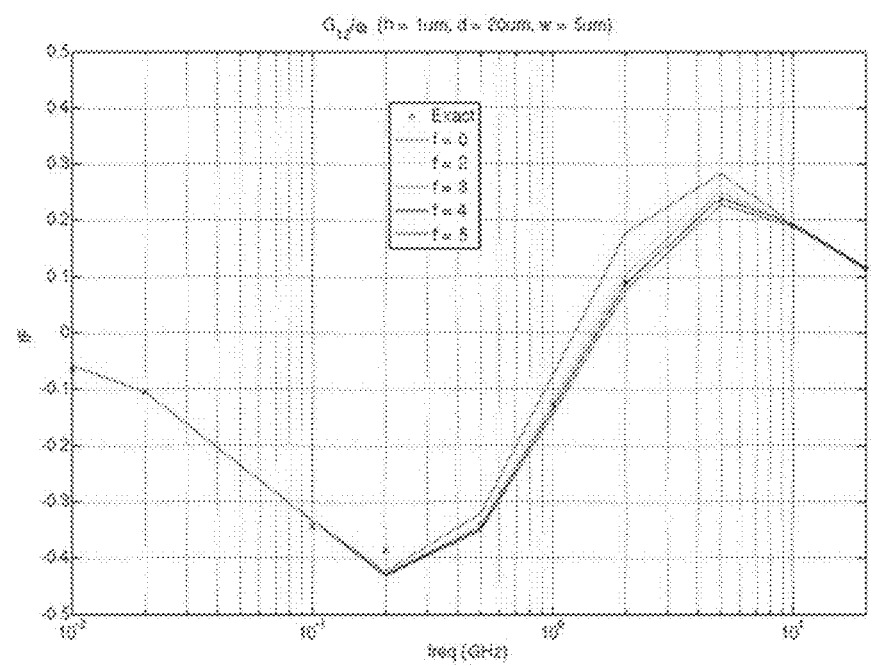
FIG. 15 is a graph showing the coupling conductance between TSV and interconnect as a function of frequency for different correction factors.

FIG. 15 is a graph 1500 showing the coupling conductance between TSV and interconnect.

Figure 16:
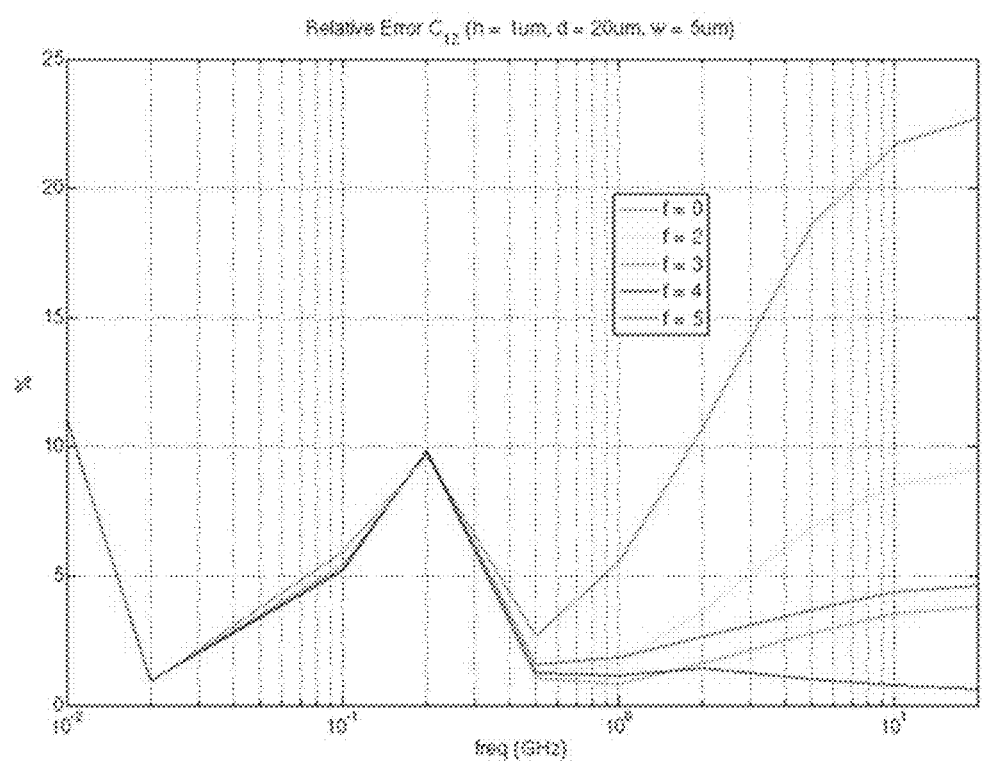
FIG. 16 is a graph showing the error of the complex coupling capacitance between TSV and interconnect as a function of frequency for different correction factors as a function of frequency for different correction factors.

FIG. 16 is a graph 1600 showing the error of the complex coupling capacitance between TSV and interconnect as a function of frequency for different correction factors.

As is demonstrated in the error plots of FIGS. 10, 13, and 16, the error is minimized for the correction factor equal to 4.

II.C.2. Accuracy Results—Fixed Correction Coefficient

In FIGS. 17-37, the structure of FIG. 1 is used, but the distance of the interconnect from the substrate h and the distance d of the interconnect from the TSV are modified for a constant correction factor equal to 4.

In particular, FIGS. 17-37 demonstrate the accuracy of an embodiment of the disclosed methodology for varying values of h and d. As can be seen, the accuracy is high (e.g., within 5%).

FIGS. 17-37 are described in more detail below with the understanding that the results presented are based on the structure shown in FIG. 4.

Figure 17:
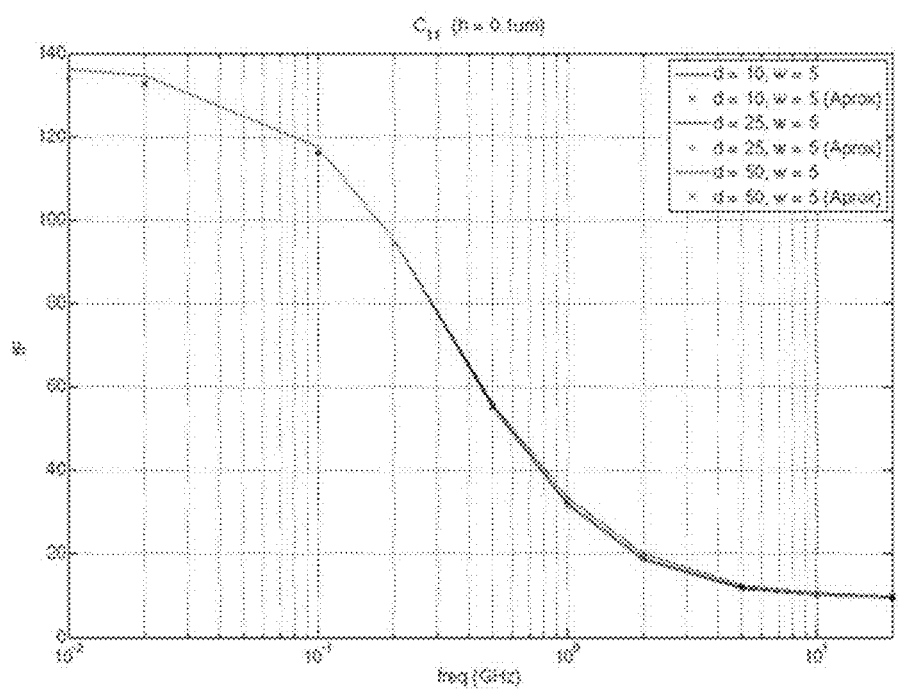
FIG. 17 is a graph showing the total real capacitance of TSV as a function of frequency (h=0.1 um, w=5 um, and varying values of d).

FIG. 17 is a graph 1700 showing the total capacitance of TSV as a function of frequency (h=0.1 um).

Figure 18:
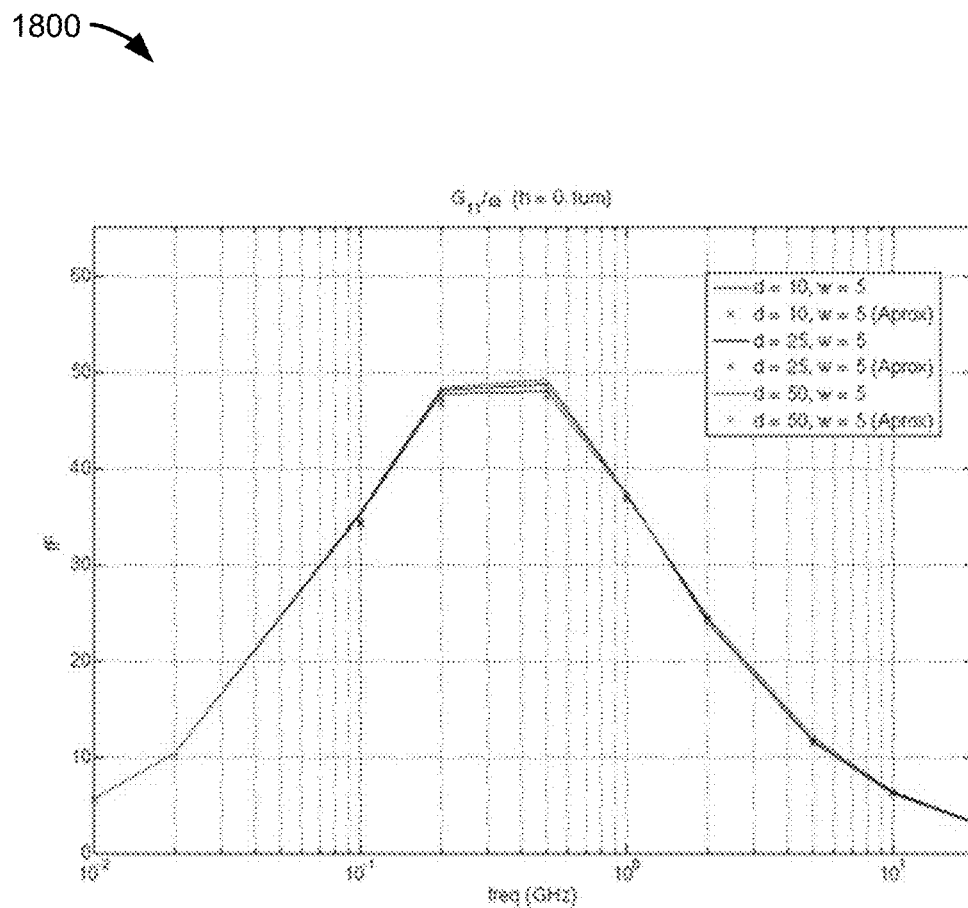
FIG. 18 is a graph showing the total conductance of TSV as a function of frequency (h=0.1 um, w=5 um, and varying values of d).

FIG. 18 is a graph 1800 showing the total conductance of TSV as a function of frequency (h=0.1 um).

Figure 19:
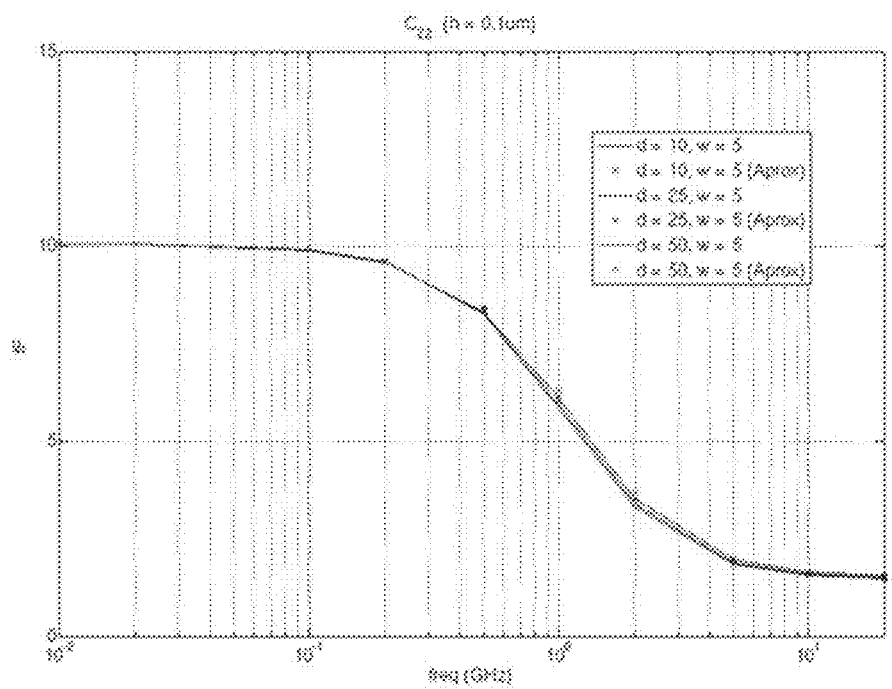
FIG. 19 is a graph showing the total real capacitance of interconnect as a function of frequency (h=0.1 um, w=5 um, and varying values of d).

FIG. 19 is a graph 1900 showing the total capacitance of interconnect as a function of frequency (h=0.1 um).

Figure 20:
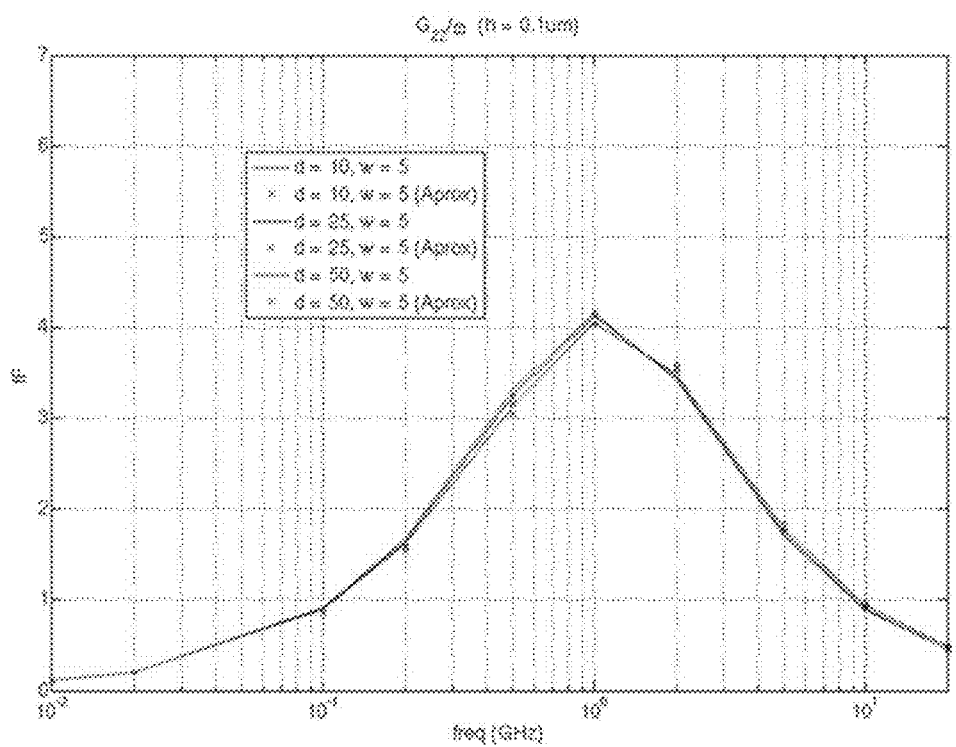
FIG. 20 is a graph showing the total conductance of interconnect as a function of frequency (h=0.1 um, w=5 um, and varying values of d).

FIG. 20 is a graph 2000 showing the total conductance of interconnect as a function of frequency (h=0.1 um).

Figure 21:
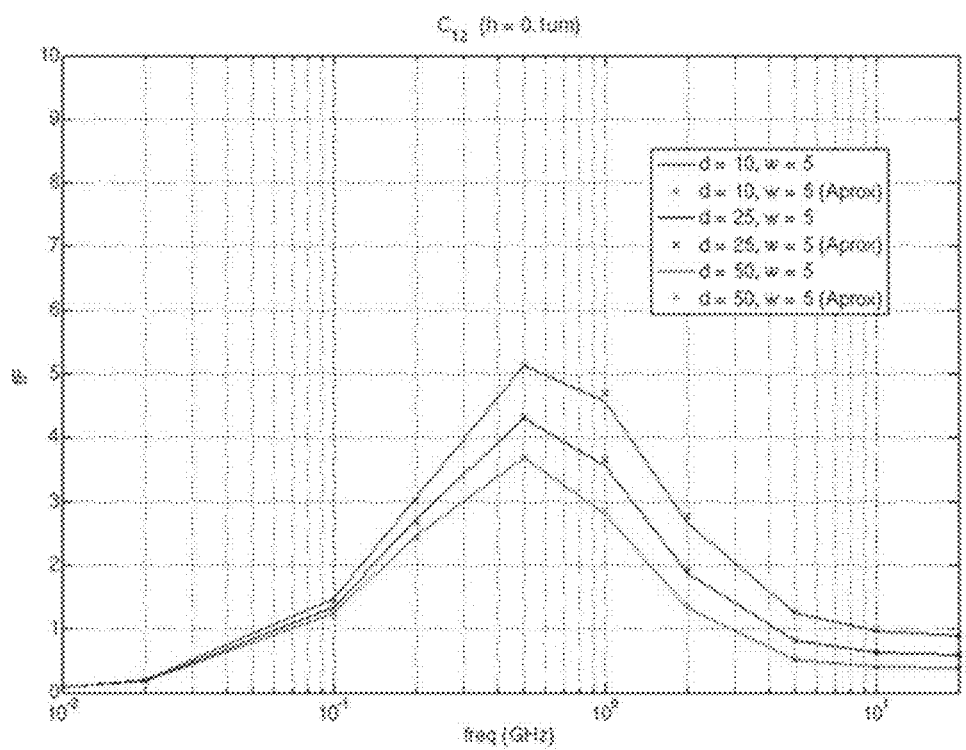
FIG. 21 is a graph showing the coupling real capacitance between TSV and interconnect as a function of frequency (h=0.1 um, w=5 um, and varying values of d).

FIG. 21 is a graph 2100 showing the coupling capacitance between TSV and interconnect as a function of frequency (h=0.1 um).

Figure 22:
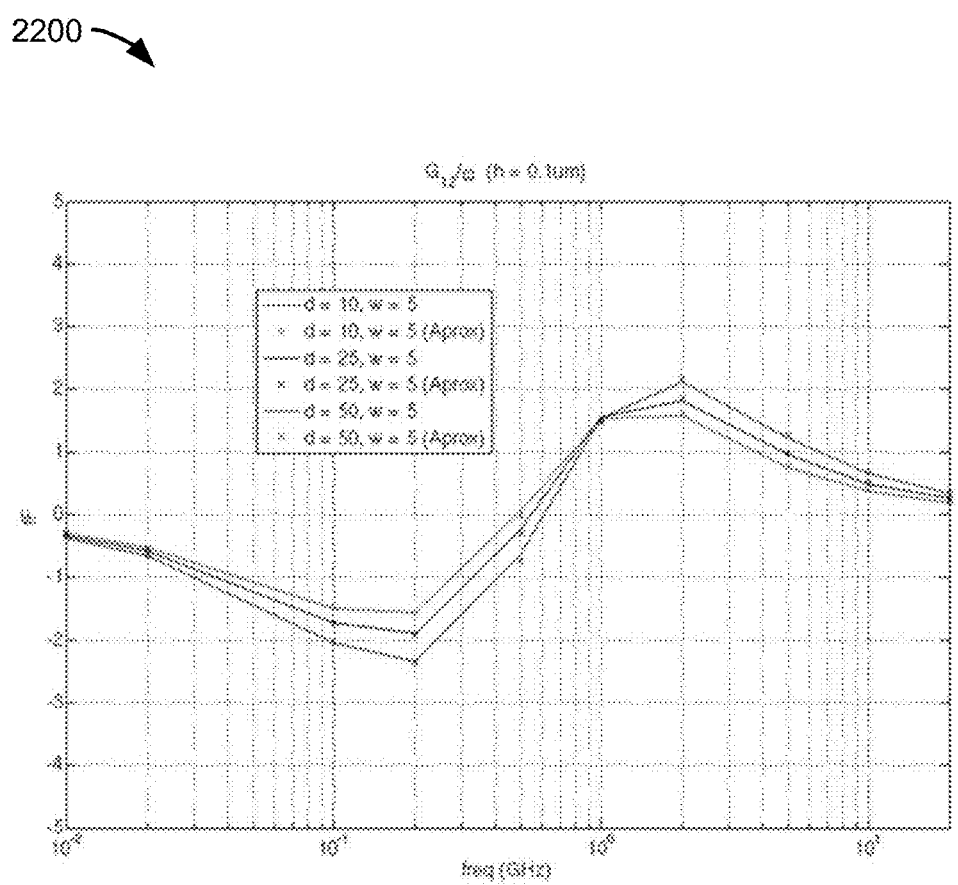
FIG. 22 is a graph showing the coupling conductance between TSV and interconnect as a function of frequency (h=0.1 um, w=5 um, and varying values of d).

FIG. 22 is a graph 2200 showing the coupling conductance between TSV and interconnect as a function of frequency (h=0.1 um).

Figure 23:
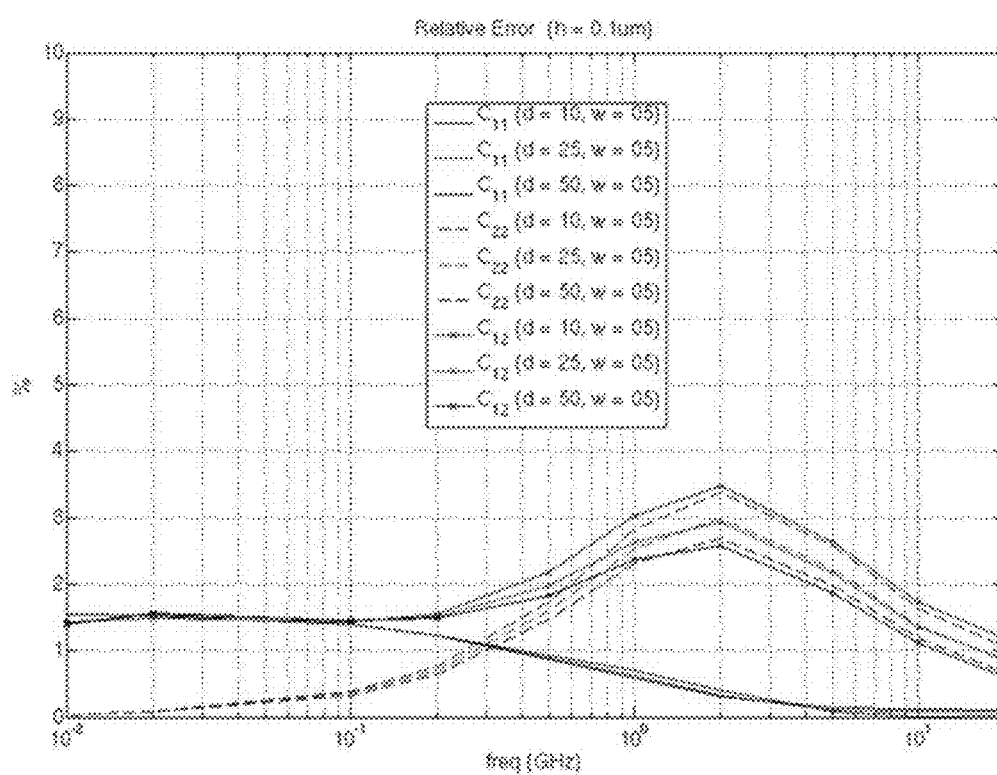
FIG. 23 is a graph showing the error of the complex capacitance as a function of frequency (h=0.1 um, w=5 um, and varying values of d).

FIG. 23 is a graph 2300 showing the error of the complex capacitance as a function of frequency (h=0.1 um).

Figure 24:
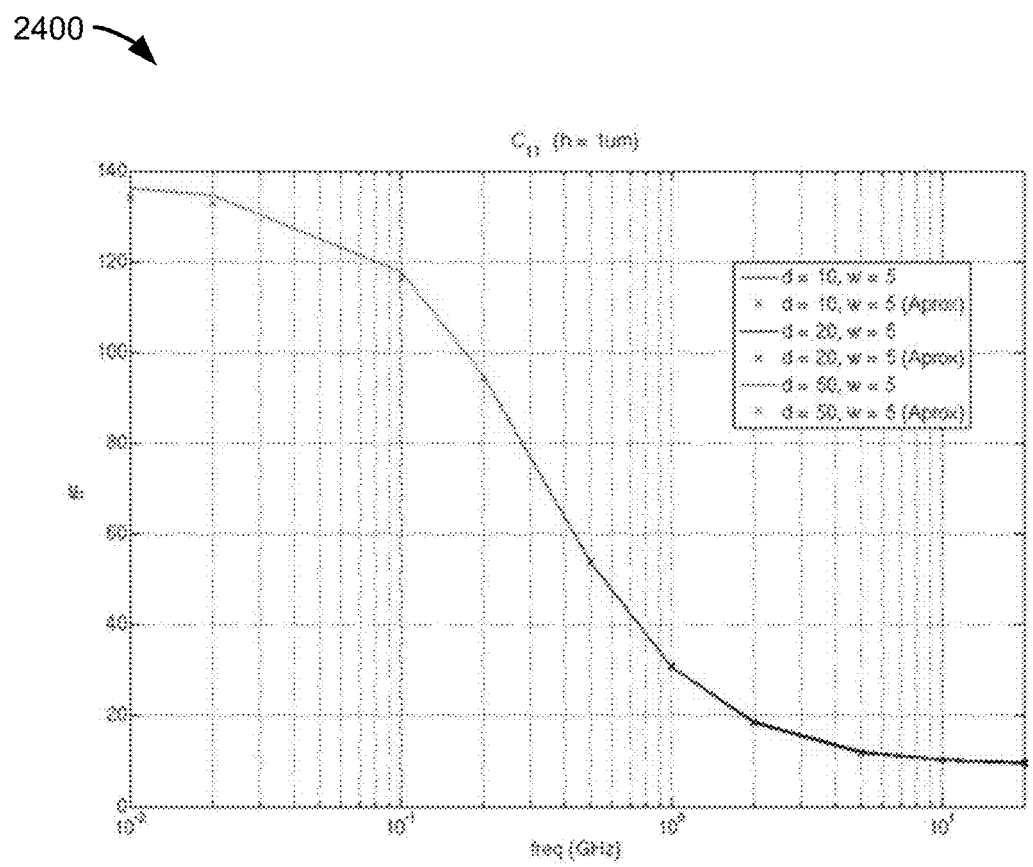
FIG. 24 is a graph showing the total real capacitance of TSV as a function of frequency (h=1 um, w=5 um, and varying values of d).

FIG. 24 is a graph 2400 showing the total capacitance of TSV as a function of frequency (h=1 um).

Figure 25:
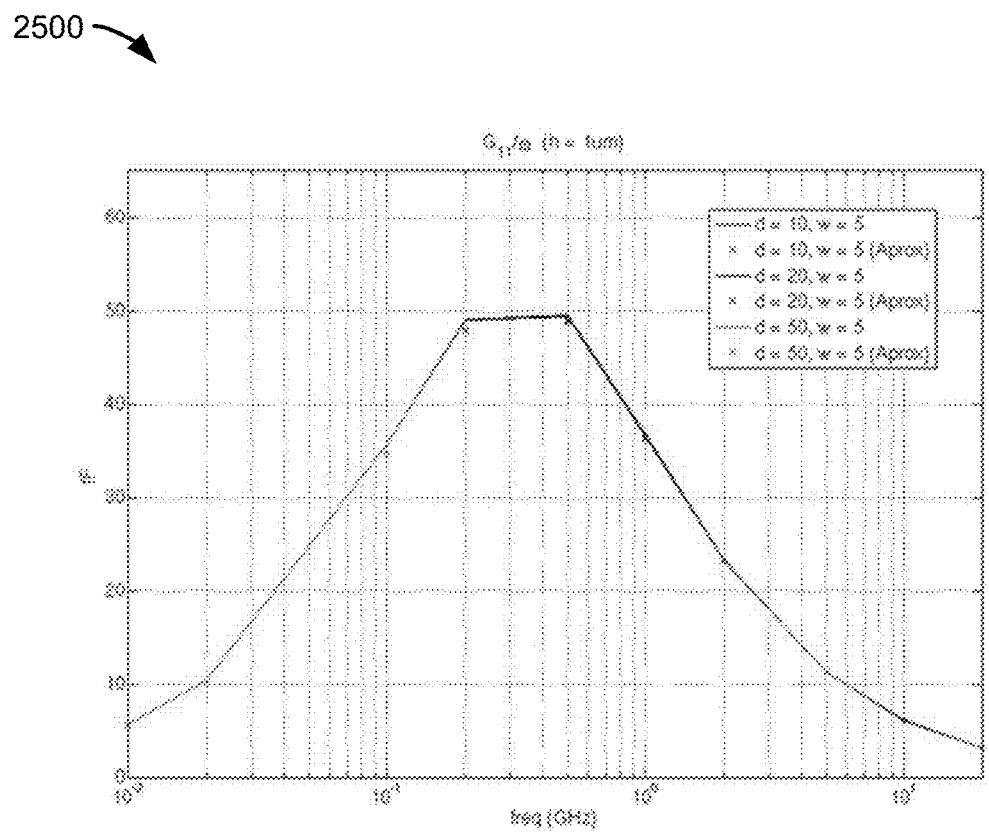
FIG. 25 is a graph showing the total conductance of TSV as a function of frequency (h=1 um, w=5 um, and varying values of d).

FIG. 25 is a graph 2500 showing the total conductance of TSV as a function of frequency (h=1 um).

Figure 26:
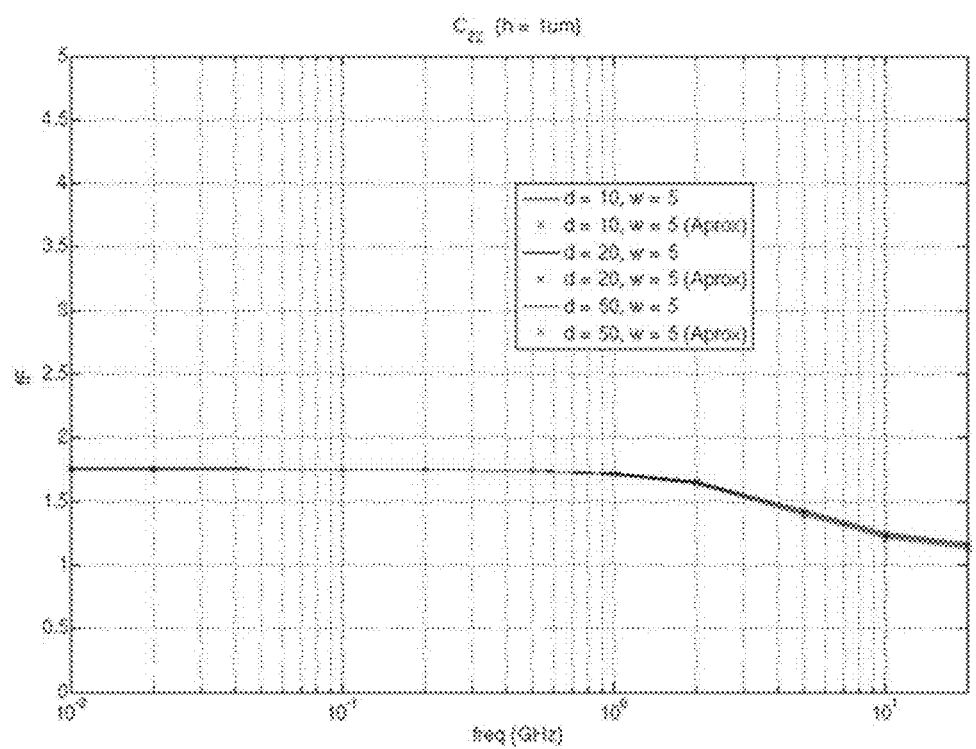
FIG. 26 is a graph showing the total real capacitance of interconnect as a function of frequency (h=1 um, w=5 um, and varying values of d).

FIG. 26 is a graph 2600 showing the total capacitance of interconnect as a function of frequency (h=1 um).

Figure 27:
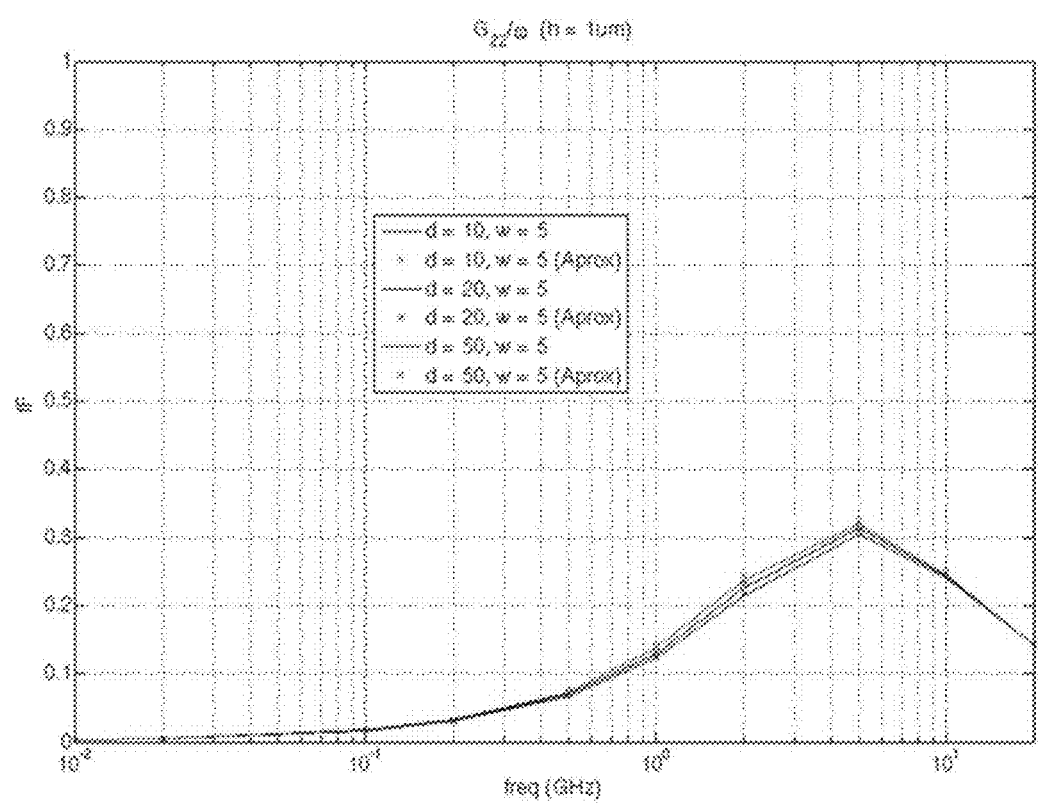
FIG. 27 is a graph showing the total conductance of interconnect as a function of frequency (h=1 um, w=5 um, and varying values of d).

FIG. 27 is a graph 2700 showing the total conductance of interconnect as a function of frequency (h=1 um).

Figure 28:
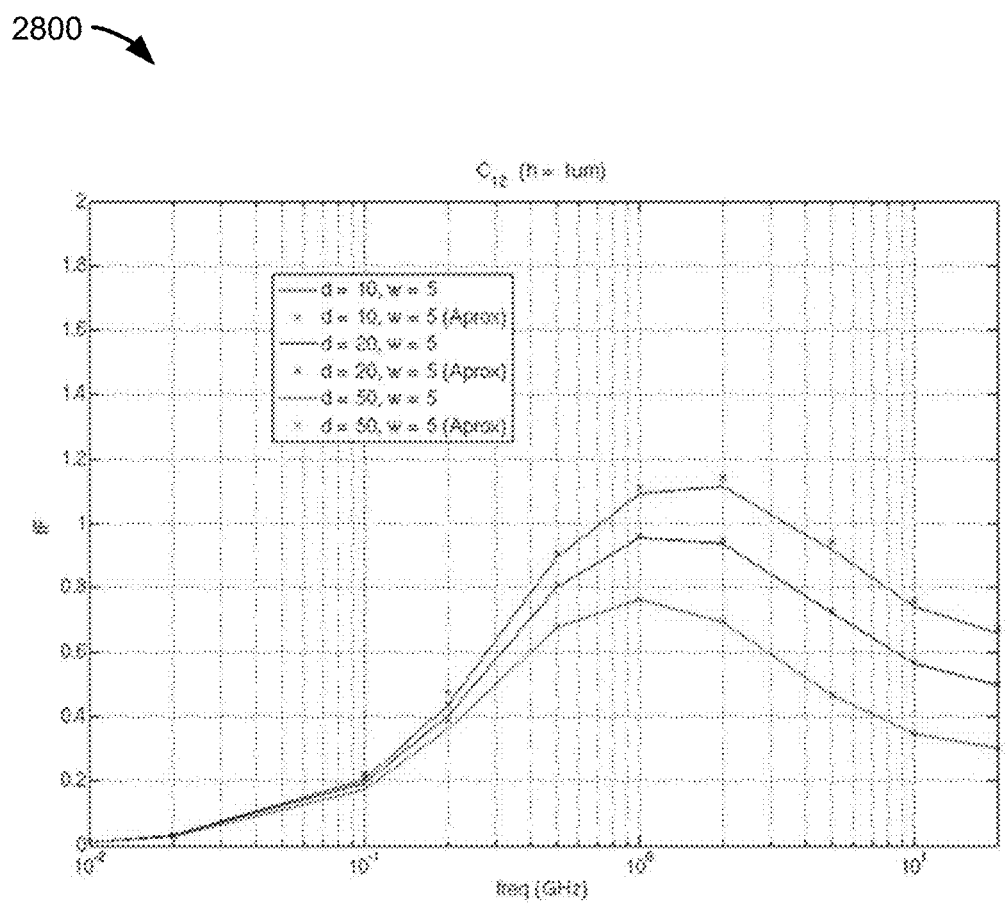
FIG. 28 is a graph showing the coupling real capacitance between TSV and interconnect as a function of frequency (h=1 um, w=5 um, and varying values of d).

FIG. 28 is a graph 2800 showing the coupling capacitance between TSV and interconnect as a function of frequency (h=1 um).

Figure 29:
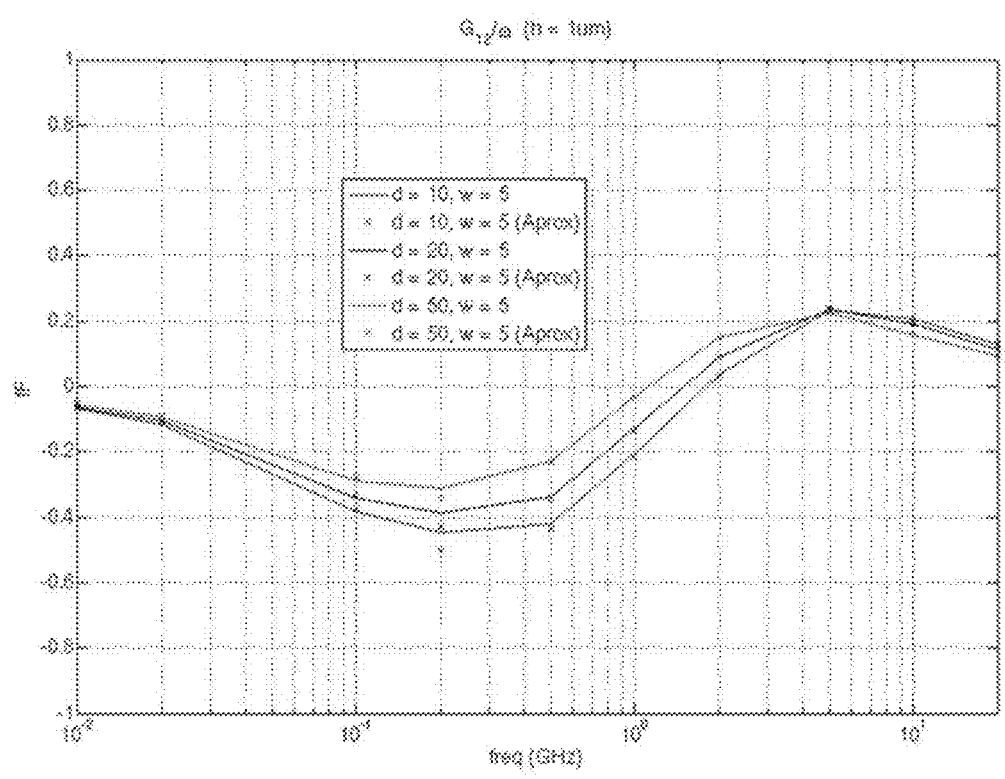
FIG. 29 is a graph showing the coupling conductance between TSV and interconnect as a function of frequency (h=1 um, w=5 um, and varying values of d).

FIG. 29 is a graph 2900 showing the coupling conductance between TSV and interconnect as a function of frequency (h=1 um).

Figure 30:
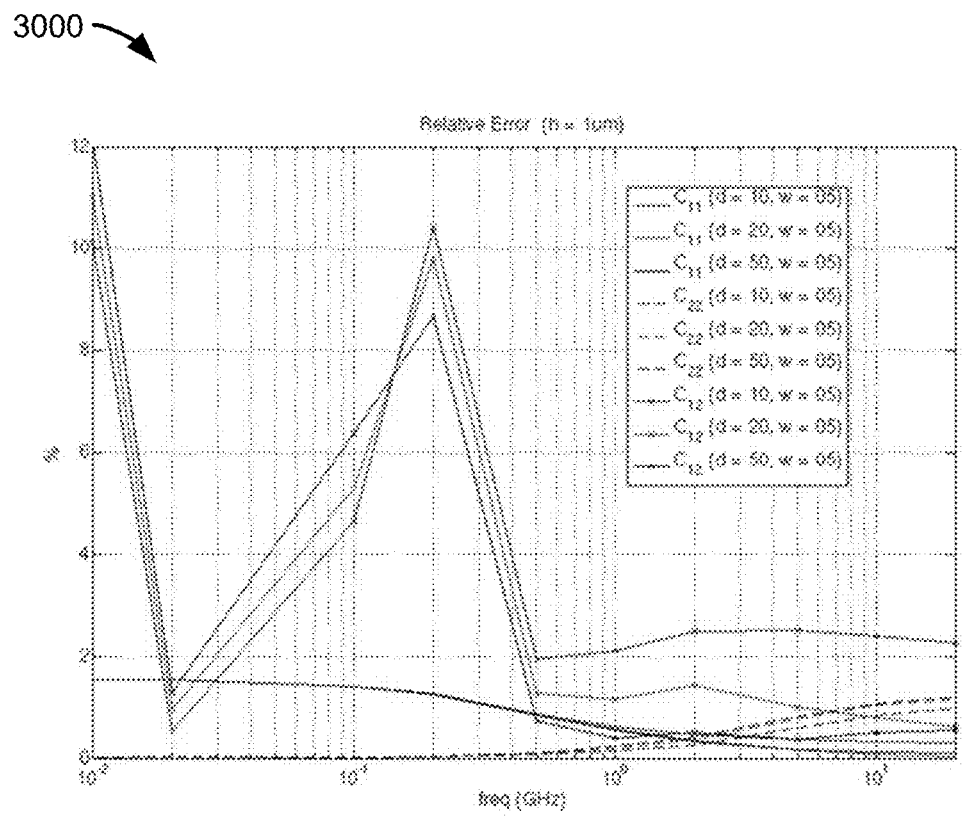
FIG. 30 is a graph showing the error of the complex capacitance as a function of frequency (h=1 um).

FIG. 30 is a graph 3000 showing the error of the complex capacitance as a function of frequency (h=1 um).

Figure 31:
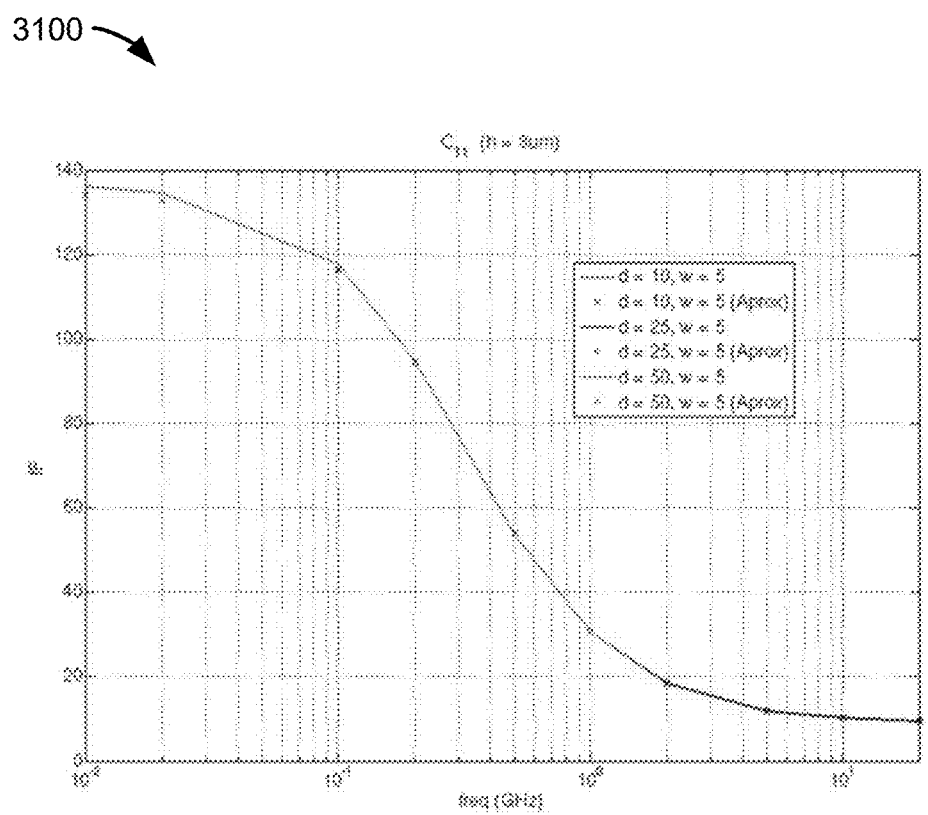
FIG. 31 is a graph showing the total real capacitance of TSV as a function of frequency (h=3 um, w=5 um, and varying values of d).

FIG. 31 is a graph 3100 showing the total capacitance of TSV as a function of frequency (h=3 um).

Figure 32:
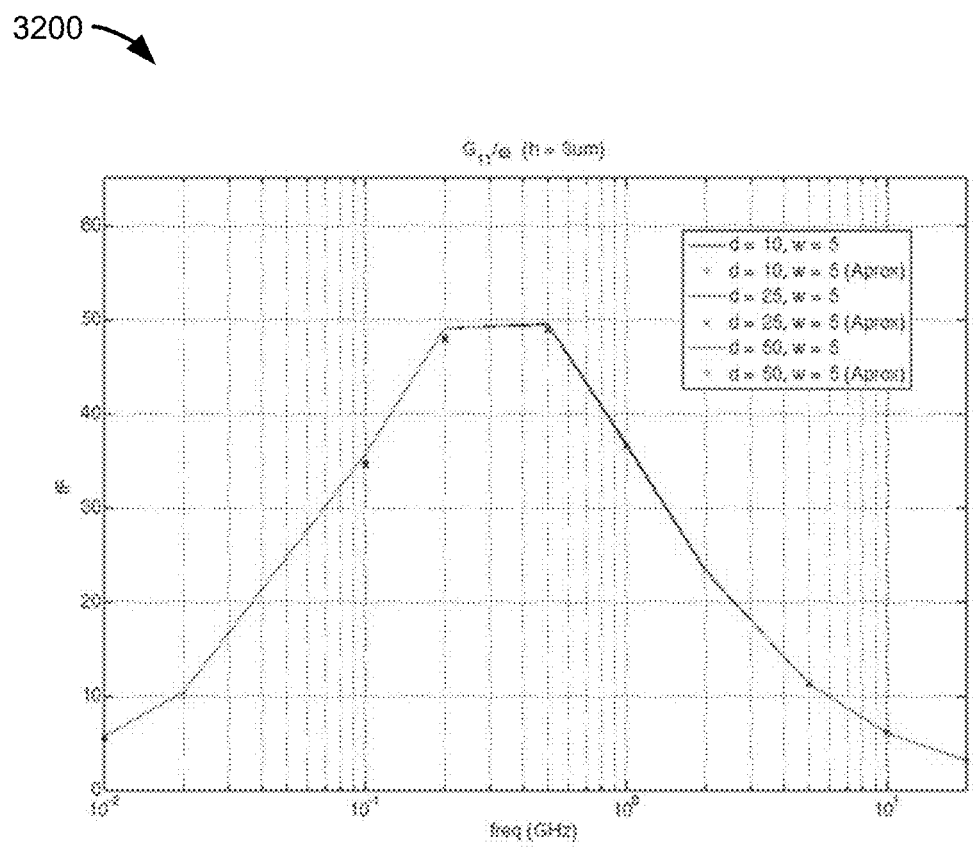
FIG. 32 is a graph showing the total conductance of TSV as a function of frequency (h=3 um, w=5 um, and varying values of d).

FIG. 32 is a graph 3200 showing the total conductance of TSV as a function of frequency (h=3 um).

Figure 33:
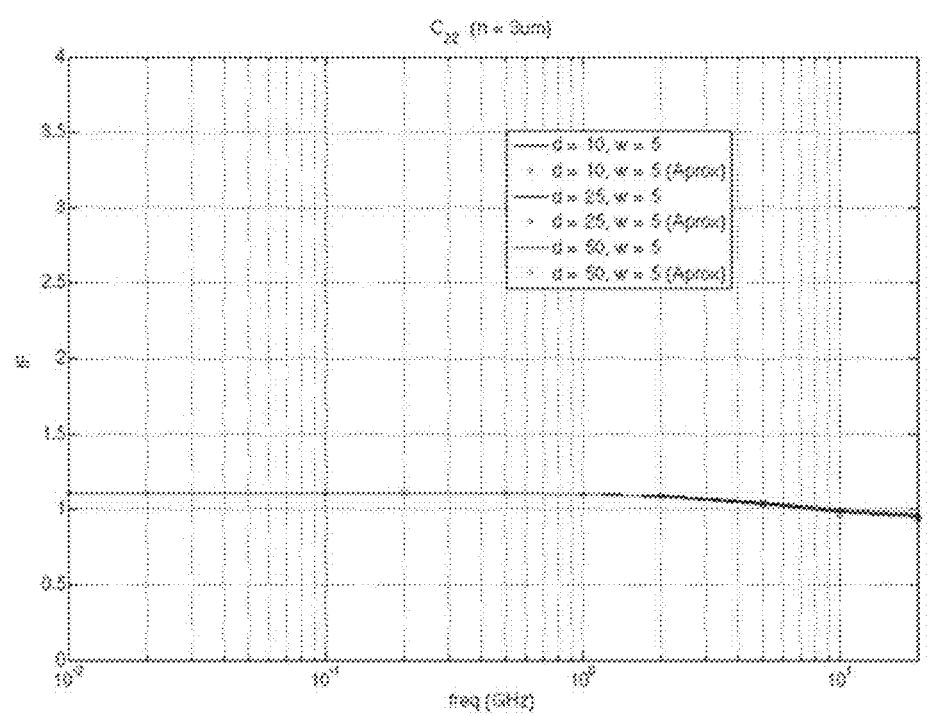
FIG. 33 is a graph showing the total real capacitance of interconnect as a function of frequency (h=3 um, w=5 um, and varying values of d).

FIG. 33 is a graph 3300 showing the total capacitance of interconnect as a function of frequency (h=3 um).

Figure 34:
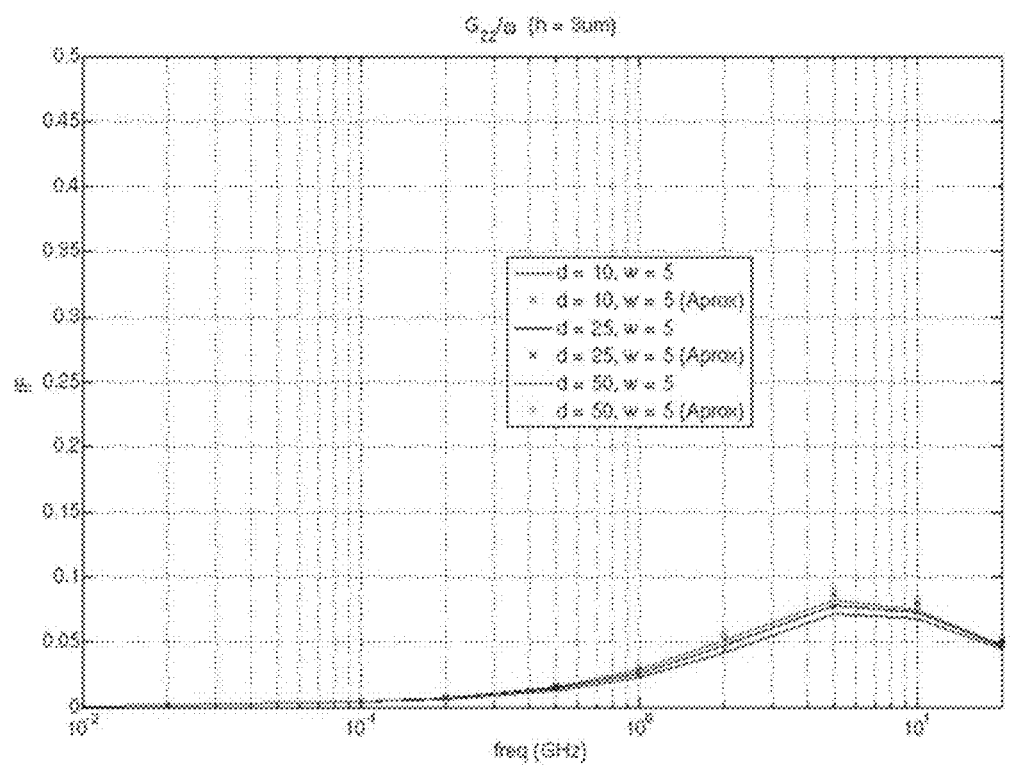
FIG. 34 is a graph showing the total conductance of interconnect as a function of frequency (h=3 um, w=5 um, and varying values of d).

FIG. 34 is a graph 3400 showing the total conductance of interconnect as a function of frequency (h=3 um).

Figure 35:
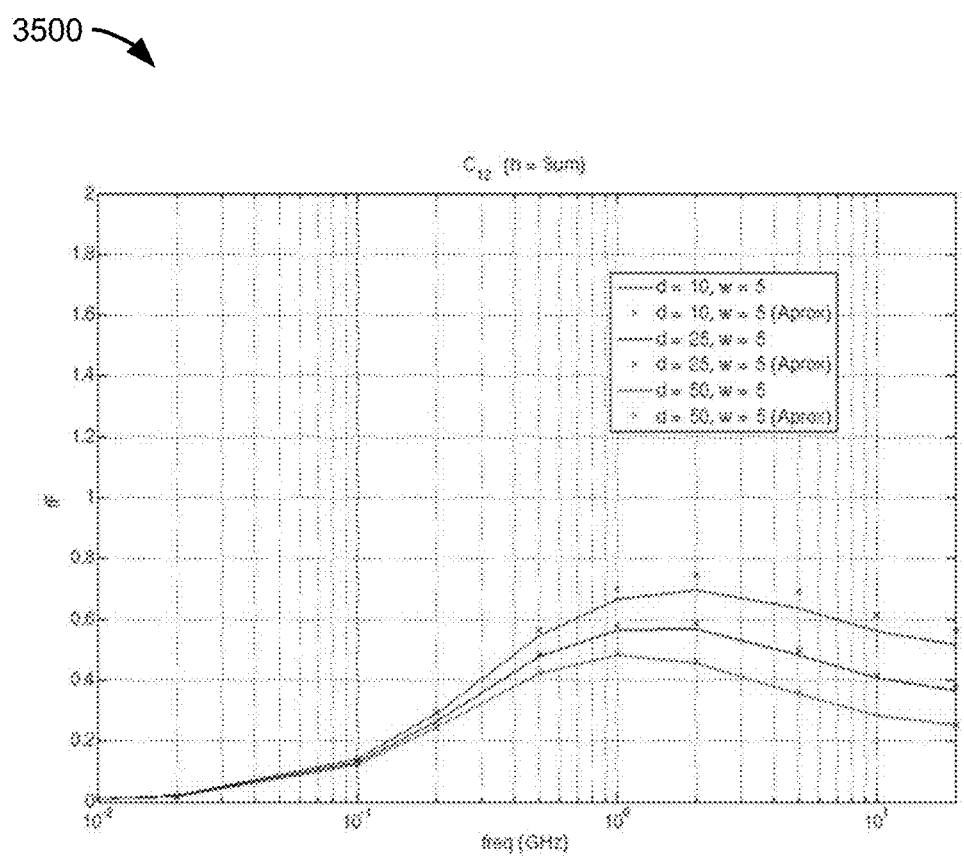
FIG. 35 is a graph showing the coupling real capacitance between TSV and interconnect as a function of frequency (h=3 um, w=5 um, and varying values of d).

FIG. 35 is a graph 3500 showing the coupling capacitance between TSV and interconnect as a function of frequency (h=3 um).

Figure 36:
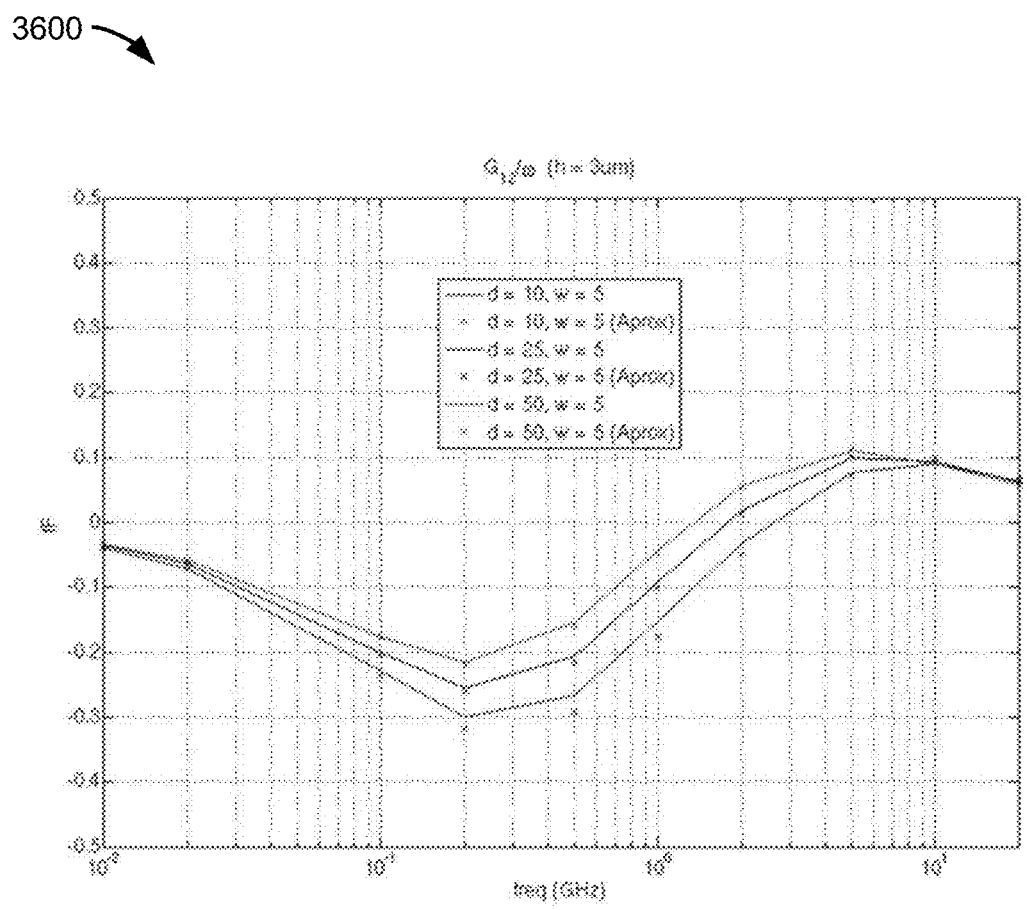
FIG. 36 is a graph showing the coupling conductance between TSV and interconnect as a function of frequency (h=3 um, w=5 um, and varying values of d).

FIG. 36 is a graph 3600 showing the coupling conductance between TSV and interconnect as a function of frequency (h=3 um).

Figure 37:
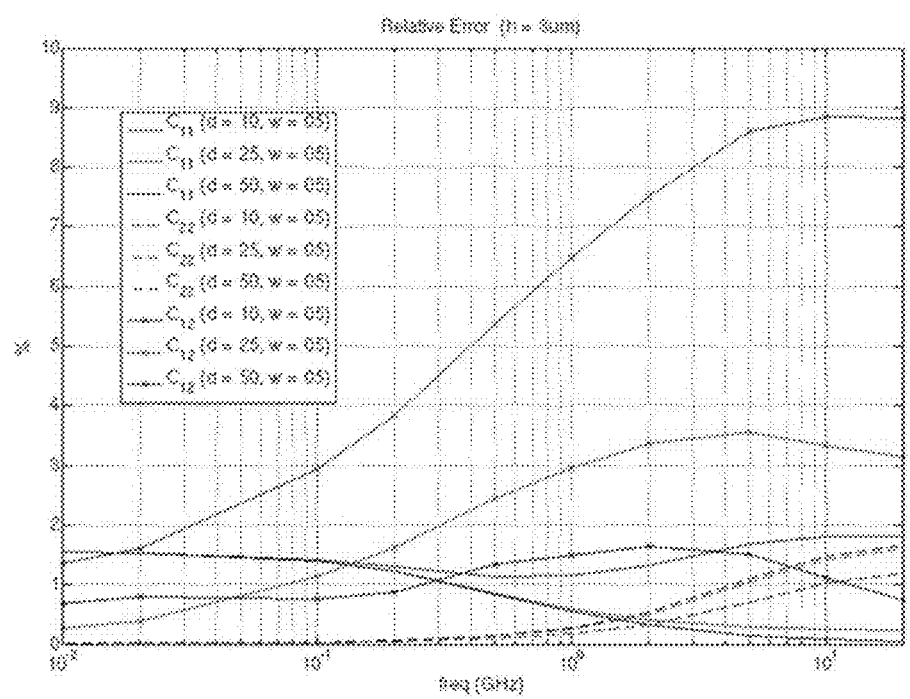
FIG. 37 is a graph 3700 showing the error of the complex capacitance as a function of frequency (h=3 um, w=5 um, and varying values of d).

FIG. 37 is a graph 3700 showing the error of the complex capacitance as a function of frequency (h=3 um).

III. Example General Embodiments

Figure 38:
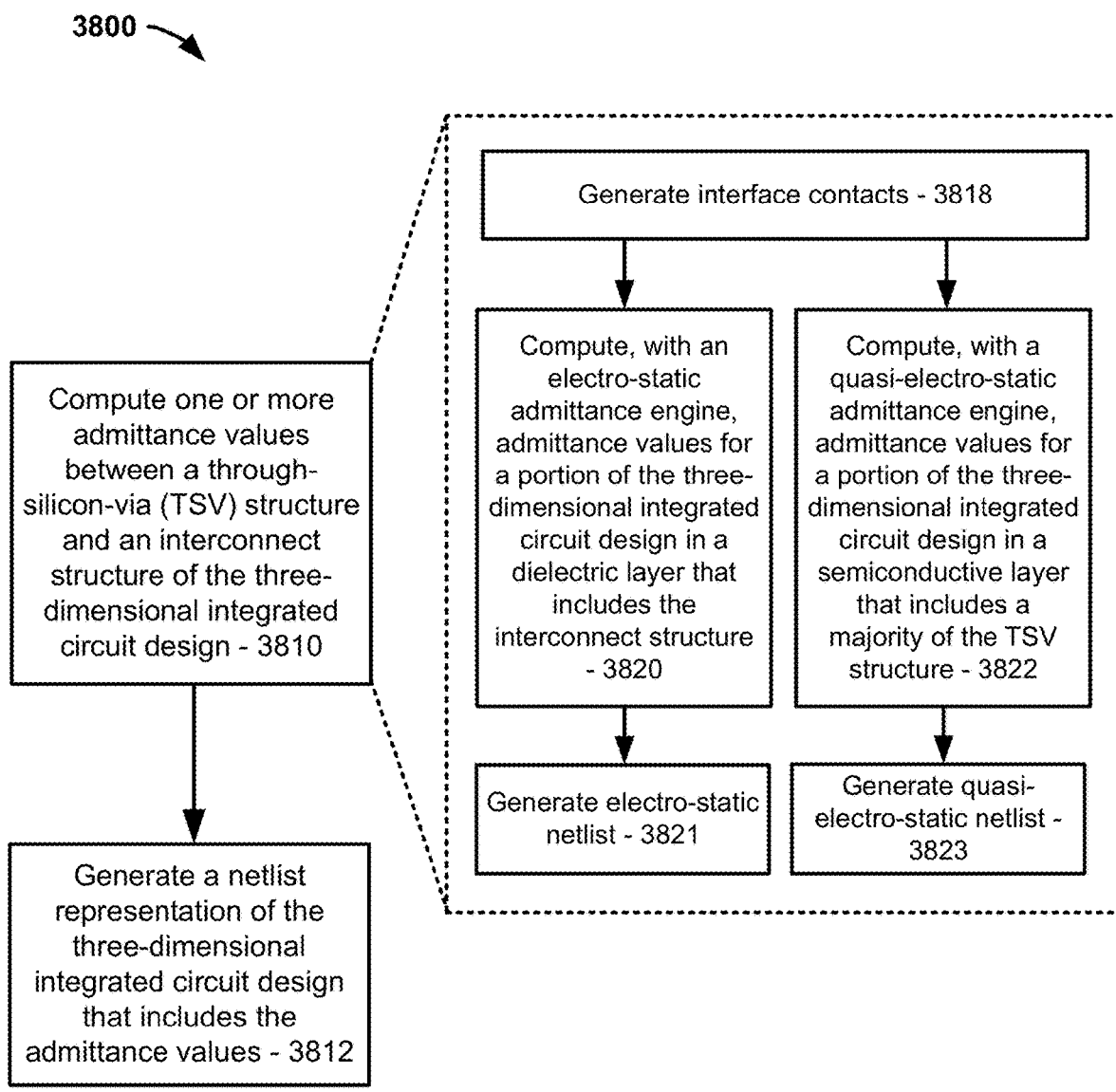
FIG. 38 is a flow chart illustrating an embodiment of the disclosed technology.

FIG. 38 is a flow chart 3800 illustrating an example embodiment for performing parasitic extraction in accordance with the disclosed technology. In particular, the method of FIG. 38 can be performed by a computer implementing a parasitic extraction tool configured to compute parasitic effects in a three-dimensional integrated circuit layout design. Although the illustrated method is described in a particular, sequential order, it should be understood that this manner of description encompasses rearrangement. For example, operations described sequentially may in some cases be rearranged or performed concurrently.

At 3810, a computation of one or more admittance values between a through-silicon-via (TSV) structure and an interconnect structure of the three-dimensional integrated circuit layout design using two or more admittance engines is performed. Each of the two admittance engines can be a field solver or a rule-based engine. For example, two field solvers can be used, two rule-based engines can be used, or any combination thereof can be used.

At 3812, a netlist representation of the three-dimensional integrated circuit layout design that includes the admittance values is generated.

More generally, and in some embodiments, each one of engines (the ES and the EQS engine) will compute a set (matrix) of complex capacitances (e.g., capacitances+admittances). Then, the two sets of complex capacitances can be combined by connecting them at the nodes corresponding to the projections.

In the illustrated embodiment, the two or more admittance engines are different from one another. For example, in certain embodiments, the computation is made by two or more admittance engines comprising an electro-static admittance engine and an electro-quasi-static admittance engine.

At 3818, and as described above, projections of the classic interconnects (referred to as "interface contacts") are generated for assisting the modeling of the coupling between the ESS and the EQS (from the physics point of view), and for acting as electrical connection points of the ES and the EQS netlists (from the electrical point of view). For example, the projection can serve as a floating conductor that provides for a continuation of voltage between the ESS and the EQSS as well as the continuation of the normal component of the displacement filed between the ESS and the EQSS, justifying its use as an electrical connection point.

At 3820, the electro-static admittance engine computes admittance values for a portion of the three-dimensional integrated circuit layout design in a dielectric layer and that includes an interconnect structure, and, by the example at 3822, the electro-quasi-static admittance engine computes admittance values for a portion of the three-dimensional integrated circuit layout design in a semiconductive layer that includes a majority of the TSV structure as well as a projection of a interconnect outside of the semiconductive layer.

At 3821, an electro-static netlist is generated based on the results of 3820; and at 3823, an electro-quasi-static netlist is generated based on the results of 3822.

Still further, in particular implementations and as described above, the electro-static admittance engine and/or the electro-quasi-static admittance engine also accounts for a portion of the TSV structure in the dielectric layer.

In some implementations, the projection of the interconnect structure is discretized to enhance the accuracy of the computation. For example, in certain implementations, the projection of the interconnect structure is discretized into two or more elements that collectively form the projection of the interconnect. Still further, and in certain examples, the two or more discretized elements are represented as volume-less structures.

In further implementations, the projection of the interconnect is not discretized but represented as a volume-less structure.

Still further, some embodiments of the disclosed technology correct for fringe effects that may be exhibited. For instance, in some embodiments, the projection of the interconnect in the electro-static admittance engine has at least one dimension larger than a corresponding dimension in the interconnect structure, and the larger dimension reduces errors produced by fringe effects.

Further embodiments comprise apparatus and computer-readable media for performing parasitic extraction in accordance with the disclosed technology.

IV. Electronic Design Automation Environment

Various examples of the disclosed subject matter are related to electronic design automation. In particular, various examples can be used to improve the operation of electronic design automation software tools that identify, verify and/or modify design data for manufacturing a microdevice, such as a microcircuit.

Designing and fabricating microcircuit devices involve many steps during a "design flow" process. These steps can be highly dependent on the type of microcircuit, its complexity, the design team, and the fabricator or foundry that will manufacture the microcircuit from the design. However, several steps are common to most design flows. First, a design specification is modeled logically, typically in a hardware design language (HDL). Once a logical design has been created, various logical analysis processes are performed on the design to verify its correctness. More particularly, software and hardware "tools" verify that the logical design will provide the desired functionality at various stages of the design flow by running software simulators and/or hardware emulators, and errors are corrected. For example, a designer may employ one or more functional logic verification processes to verify that, given a specified input, the devices in a logical design will perform in the desired manner and provide the appropriate output.

In addition to verifying that the devices in a logic design will provide the desired functionality, some designers may employ a design logic verification process to verify that the logical design meets specified design requirements. For example, a designer may create rules such as, e.g., every transistor gate in the design must have an electrical path to ground that passes through no more than three other devices, or every transistor that connects to a specified power supply also must be connected to a corresponding ground node, and not to any other ground node. A design logic verification process then will determine if a logical design complies with specified rules, and identify occurrences where it does not.

After the logical design is deemed satisfactory, it is converted into physical design data by synthesis software. This physical design data or "layout" design data may represent, for example, the geometric elements that will be written onto a mask used to fabricate the desired microcircuit device in a photolithographic process at a foundry. For conventional mask or reticle writing tools, the geometric elements typically will be polygons of various shapes. Thus, the layout design data usually includes polygon data describing the features of polygons in the design. It is very important that the physical design information accurately embody the design specification and logical design for proper operation of the device. Accordingly, after it has been created during a synthesis process, the physical design data is compared with the original logical design schematic in a process sometimes referred to as a "layout-versus-schematic" (LVS) process.

The physical design can introduce additional properties into the design. For example, the physical wires connecting different logical elements of the design can include parasitic resistors, parasitic capacitors, and parasitic inductors. A parasitic extraction software tool (also referred to as an XRC tool for "eXtract Resistors and Capacitors" or xACT) can be used to calculate or "extract" the parasitic resistors, capacitors, and inductors of the wires of the design. As noted above, embodiments of the disclosed technology concern improvements to the parasitic extraction process for layout designs having through silicon vias in the presence of interconnect.

The parasitic resistors, capacitors, and inductors will affect a speed of signals propagating from one logic circuit to another logic circuit. The changes in timing due to the parasitic elements can potentially introduce timing violations into the design that, if not corrected, can make the design malfunction. A static timing tool can be used to calculate a cycle time for a set of logic paths and identify any timing paths that can potentially violate setup or hold times of a sequential logic element (such as a flip-flop). Additionally, the effects of the parasitic elements can be annotated onto the logic paths so that the design can be simulated (this can be referred to as simulating with "gates") with the more accurate timing information to verify that the design functions correctly.

Once the correctness of the logical design has been verified, and geometric data corresponding to the logical design has been created in a layout design, the geometric data then can be analyzed using additional checks. For example, because the physical design data is employed to create masks used at a foundry, the data must conform to the foundry's requirements. Each foundry specifies its own physical design parameters for compliance with their processes, equipment, and techniques. Accordingly, the design flow may include a process to confirm that the design data complies with the specified parameters. During this process, the physical layout of the circuit design is compared with design rules in a process commonly referred to as a "design rule check" (DRC) process. In addition to rules specified by the foundry, the design rule check process may also check the physical layout of the circuit design against other design rules, such as those obtained from test chips, general knowledge in the industry, previous manufacturing experience, or other sources of design rules.

The parasitic resistors and capacitors can also be used in various "design-for-reliability" (DFR) software tools, such as an electromigration (EM) checker. The EM effect is the transport of material caused by the gradual movement of ions in a conductor, due to the momentum transfer between conducting electrons and diffusing metal atoms. The EM effect can be important in applications where relatively high direct current densities are used, such as in microelectronics and related structures. The EM checker can analyze the current flow of conducting layers within the physical design using the parasitic resistors and capacitors of the design. The EM checker can identify potentially problematic areas (e.g., areas where current flow exceeds a threshold for a given layer type) and/or modify the physical design to reduce the current flow through the potentially problematic areas. Thus, the parasitic resistors and capacitors can be used by a process to potentially increase the operational lifetime of the manufactured design by improving the electromigration characteristics of the physical design.

With modern electronic design automation design flows, a designer may additionally employ one or more "design-for-manufacture" (DFM) software tools. As previously noted, design rule check processes attempt to identify, for examples, layout features representing structures that will almost certainly be improperly formed during a manufacturing process. "Design-For-Manufacture" tools, however, provide processes that attempt to identify elements in a design representing structures with a significant likelihood of being improperly formed during the manufacturing process. A "design-for-manufacture" process may additionally determine what impact the improper formation of the identified elements will have on the yield of devices manufactured from the circuit layout design, and/or modifications that will reduce the likelihood that the identified elements will be improperly formed during the manufacturing process. For example, a "design-for-manufacture" (DFM) software tool may identify wires that are connected by only a single via, determine the yield impact for manufacturing a circuit from the design based upon the probability that each individual single via will be improperly formed during the manufacturing process, and then identify areas where redundant vias can be formed to supplement the single vias.

It should be noted that, in addition to "design-for-manufacture," various alternate terms are used in the electronic design automation industry. Accordingly, as used herein, the term "design-for-manufacture" or "design-for-manufacturing" is intended to encompass any electronic design automation process that identifies elements in a design representing structures that may be improperly formed during the manufacturing process. Thus, "design-for-manufacture" (DFM) software tools will include, for example, "lithographic friendly design" (LFD) tools that assist designers to make trade-off decisions on how to create a circuit design that is more robust and less sensitive to lithographic process windows. They will also include "design-for-yield" (DFY) electronic design automation tools, "yield assistance" electronic design automation tools, and "chip cleaning" and "design cleaning" electronic design automation tools.

After a designer has used one or more geometry analysis processes to verify that the physical layout of the circuit design is satisfactory, the designer may then perform one or more simulation processes to simulate the operation of a manufacturing process, in order to determine how the design will actually be realized by that particular manufacturing process. A simulation analysis process may additionally modify the design to address any problems identified by the simulation. For example, some design flows may employ one or more processes to simulate the image formed by the physical layout of the circuit design during a photolithographic process, and then modify the layout design to improve the resolution of the image that it will produce during a photolithography process.

These resolution enhancement techniques (RET) may include, for example, modifying the physical layout using optical proximity correction (OPC) or by the addition of sub-resolution assist features (SRAF). Other simulation analysis processes may include, for example, phase shift mask (PSM) simulation analysis processes, etch simulation analysis processes and planarization simulation analysis processes. Etch simulation analysis processes simulate the removal of materials during a chemical etching process, while planarization simulation processes simulate the polishing of the circuit's surface during a chemical-mechanical etching process. These simulation analysis processes may identify, for example, regions where an etch or polishing process will not leave a sufficiently planar surface. These simulation analysis processes may then modify the physical layout design to, e.g., include more geometric elements in those regions to increase their density.

Once a physical layout design has been finalized, the geometric elements in the design are formatted for use by a mask or reticle writing tool. Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool. Accordingly, the larger geometric elements in a physical layout design data will typically be "fractured" into the smaller, more basic polygons that can be written by the mask or reticle writing tool.

It should be appreciated that various design flows may repeat one or more processes in any desired order. Thus, with some design flows, parasitic analysis processes can be interleaved with other processes. Parasitic analysis, simulation analysis processes and/or logical analysis processes. For example, once the physical layout of the circuit design has been modified using resolution enhancement techniques, then a design rule check process or design-for-manufacturing process may be performed on the modified layout, Further, these processes may be alternately repeated until a desired degree of resolution for the design is obtained. During these iterations, one can re-run a circuit verification parasitic extraction tool employing any one or more of the embodiments as disclosed herein. Similarly, a design rule check process and/or a design-for-manufacturing process may be employed after an optical proximity correction process, a phase shift mask simulation analysis process, an etch simulation analysis process or a planarization simulation analysis process.

IV.A. Software Tools for Simulation, Verification or Modification of a Circuit Layout To facilitate an understanding of various embodiments of the disclosed technology, one such software tool for electronic design automation, directed to the analysis and modification of a design for an integrated circuit, will now be generally described.

Figure 39:
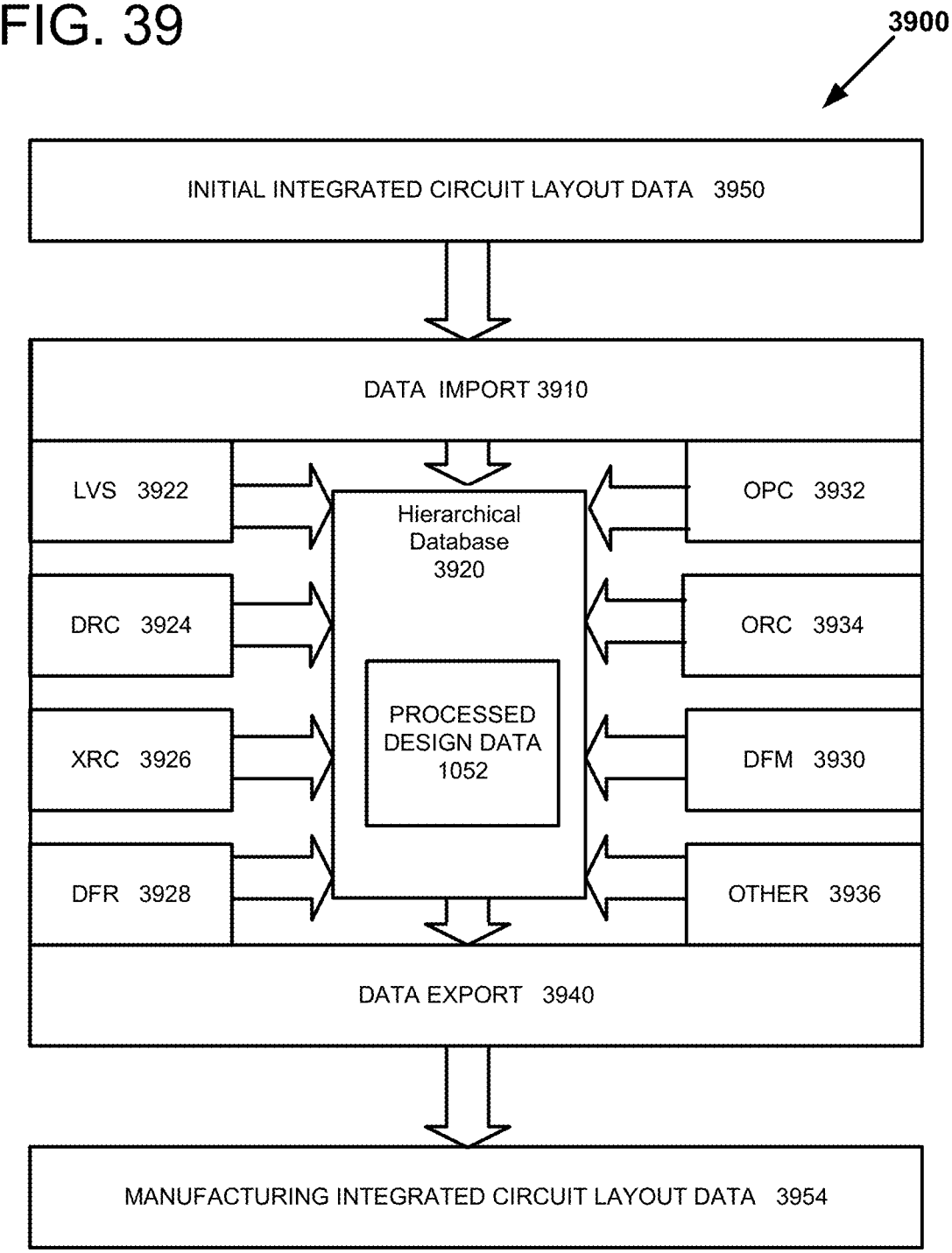
FIG. 39 is a schematic block diagram showing an integrated circuit design flow in which the disclosed technology can be incorporated.

As seen in FIG. 39, an analysis tool 3900, which may be implemented by a variety of different software applications, includes a data import module 3910 and a hierarchical database 3920. The analysis tool 3900 also includes a layout-versus-schematic ("LVS") verification module 3922, a design rule check ("DRC") module 3924, an extract-resistance-and-capacitance ("XRC") module 3926, a design-for-reliability ("DFR") module 3928, a design-for-manufacturing ("DFM") module 3930, an optical proximity correction ("OPC") module 3932, and an optical proximity rule check ("ORC") module 3934. The analysis tool 3900 may further include other modules 3936 for performing additional functions as desired, such as a phase shift mask ("PSM") module (not shown), an etch simulation analysis module (not shown) and/or a planarization simulation analysis module (not shown). The tool 3900 also has a data export module 3940. One example of such an analysis tool is the Calibre family of software applications available from Mentor Graphics Corporation of Wilsonville, Oreg.

Initially, the tool 3900 receives data 3950 describing a physical layout design for an integrated circuit. The layout design data 1050 may be in any desired format, such as, for example, the Graphic Data System II ("GDSII") data format or the Open Artwork System Interchange Standard ("OASIS") data format proposed by Semiconductor Equipment and Materials International ("SEMI"). Other formats for the data 3950 may include an open source format named Open Access, Milkyway by Synopsys, Inc., and EDDM by Mentor Graphics, Inc. The layout data 3950 includes geometric elements for manufacturing one or more portions of an integrated circuit device. For example, the initial integrated circuit layout data 3950 may include a first set of polygons for creating a photolithographic mask that in turn will be used to form an isolation region of a transistor, a second set of polygons for creating a photolithographic mask that in turn will be used to form a contact electrode for the transistor, and a third set of polygons for creating a photolithographic mask that in turn will be used to form an interconnection line (i.e., a conductor) to the contact electrode. The initial integrated circuit layout data 3950 may be converted by the data import module 3910 into a format that can be more efficiently processed by the remaining components of the tool 3900.

Once the data import module 3910 has converted the original integrated circuit layout data 3950 to the appropriate format, the processed layout data 3952 is stored in the hierarchical database 3920 for use by the various operations executed by the modules 3922-3936. Next, the layout-versus-schematic module 3922 checks the layout design data 3952 in a layout-versus-schematic process, to verify that it matches the original design specifications for the desired integrated circuit. If discrepancies between the layout design data 3952 and the logical design for the integrated circuit are identified, then the layout design data 3952 may be revised to address one or more of these discrepancies. Thus, the layout-versus-schematic process performed by the layout-versus-schematic module 3922 may lead to a new version of the layout design data with revisions. According to various implementations of the tool 3900, the layout data 3952 may be manually revised by a user, automatically revised by the layout-versus-schematic module 3922, or some combination thereof.

Next, the design rule check module 3924 confirms that the verified layout data 3952 complies with defined geometric design rules. If portions of the layout data 3952 do not adhere to or otherwise violate the design rules, then the layout data 3952 may be modified to ensure that one or more of these portions complies with the design rules. The design rule check process performed by the design rule check module 3924 thus also may lead to a new version of the layout design data with various revisions. Again, with various implementations of the tool 3900, the layout data 3952 may be manually modified by a user, automatically modified by the design rule check module 3924, or some combination thereof.

The modified layout data 3952 can be processed by the parasitic extraction software module (XRC) 3926. As previously noted, the XRC module 3926 can perform a series of steps to extract parasitic resistors and capacitors from the geometric information of the modified layout data 3952. As one example, the XRC module 3926 can decompose the geometric data of the conducting (or dielectric) layers into homogeneous portions and nonhomogeneous portions; use a beachline algorithm to generate a skeleton comprising nodes within the nonhomogeneous portions; map resistance (or capacitance) values to segments connecting the nodes of the skeleton; and generate a data structure (e.g., a netlist) representative of the conducting layer based on the skeleton and the mapped resistance and/or capacitance values. The netlist can be added to the modified layout data 3952 so that other modules within the tool 3900 can access the parasitic characteristics of the layout data 3952.

The modified layout data 3952 can be processed by the design-for-reliability software tool (DFR) 3928. A "design-for-reliability" processes attempts to identify elements in a design representing structures with a significant likelihood of shortening an operational lifetime of the manufactured design. As one example, a "design-for-reliability" process may include an electromigration (EM) module that identifies areas of the design where current flow per unit width may exceed design guidelines. The EM module can identify structures where the EM effect may potentially cause a failure of the design and/or the EM module can automatically add corrective measures for the design. For example, the EM module can correct areas of high current density by widening conductors in an area of high current density, moving cutouts and/or contacts, re-routing the affected routing net and/or neighboring routing nets, adding parallel connections, and so forth. The automatic and/or manual modifications can be propagated into the modified layout data 3952

The modified layout data 3952 is then processed by the design for manufacturing module 3930. As previously noted, a "design-for-manufacture" process attempts to identify elements in a design representing structures with a significant likelihood of being improperly formed during the manufacturing process. A "design-for-manufacture" process may additionally determine what impact the improper formation of the identified structures will have on the yield of devices manufactured from the circuit design, and/or modifications that will reduce the likelihood that the identified structures may be improperly formed during the manufacturing process. For example, a "design-for-manufacture" (DFM) software tool may identify wires that are connected by single vias, determine the yield impact based upon the probability that each individual single via will be improperly formed during the manufacturing process, and then identify areas where redundant vias can be formed to supplement the single vias.

The processed layout data 3952 is then passed to the optical proximity correction (OPC) module 3932, which corrects the layout data 3952 for manufacturing distortions that would otherwise occur during the lithographic patterning. For example, the optical proximity correction module 3932 may correct for image distortions, optical proximity effects, photoresist kinetic effects, and etch loading distortions. The layout data 3952 modified by the optical proximity correction module 3932 then is provided to the optical process rule check module 3934.

The optical process rule check module 3934 (more commonly called the optical rules check module or ORC module) ensures that the changes made by the optical proximity correction module 3932 are actually manufacturable, a "downstream-looking" step for layout verification. This compliments the "upstream-looking" step of the LVS performed by the LVS module 3922 and the self-consistency check of the DRC process performed by the DRC module 3924, adding symmetry to the verification step. Thus, each of the processes performed by the design for manufacturing process 3930, design for manufacturing reliability module 3928, the optical proximity correction module 3932, and the optical process rule check module 3934 may lead to a new version of the layout design data with various revisions.

As previously noted, other modules 3936 may be employed to perform alternate or additional manipulations of the layout data 3952, as desired. For example, some implementations of the tool 3900 may employ, for example, a phase shift mask module. As previously discussed, with a phase-shift mask (PSM) analysis (another approach to resolution enhancement technology (RET)), the geometric elements in a layout design are modified so that the pattern they create on the reticle will introduce contrast-enhancing interference fringes in the image. The tool 3900 also may alternately or additionally employ, for example, an etch simulation analysis processes or a planarization simulation analysis processes. The process or processes performed by each of these additional modules 3936 may also lead to the creation of a new version of the layout data 3952 that includes revisions.

After all of the desired operations have been performed on the initial layout data 3950, the data export module 3940 converts the processed layout data 3952 into manufacturing integrated circuit layout data 3954 that can be used to form one or more masks or reticules to manufacture the integrated circuit (that is, the data export module 3940 converts the processed layout data 3952 into a format that can be used in a photolithographic manufacturing process). Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool.

Accordingly, the data export module 3940 may "fracture" larger geometric elements in the layout design, or geometric elements that are not right triangles, rectangles or trapezoids (which typically are a majority of the geometric elements in a layout design) into the smaller, more basic polygons that can be written by the mask or reticle writing tool. Of course, the data export module 3940 may alternately or additionally convert the processed layout data 3952 into any desired type of data, such as data for use in a synthesis process (e.g., for creating an entry for a circuit library), data for use in a place-and-route process, data for use in calculating parasitic effects, etc. Further, the tool 3900 may store one or more versions of the layout 3952 containing different modifications, so that a designer can undo undesirable modifications. For example, the hierarchical database 3920 may store alternate versions of the layout data 3952 created during any step of the process flow between the modules 3922-3936.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently.

V. Example Computing Environment

Figure 40:
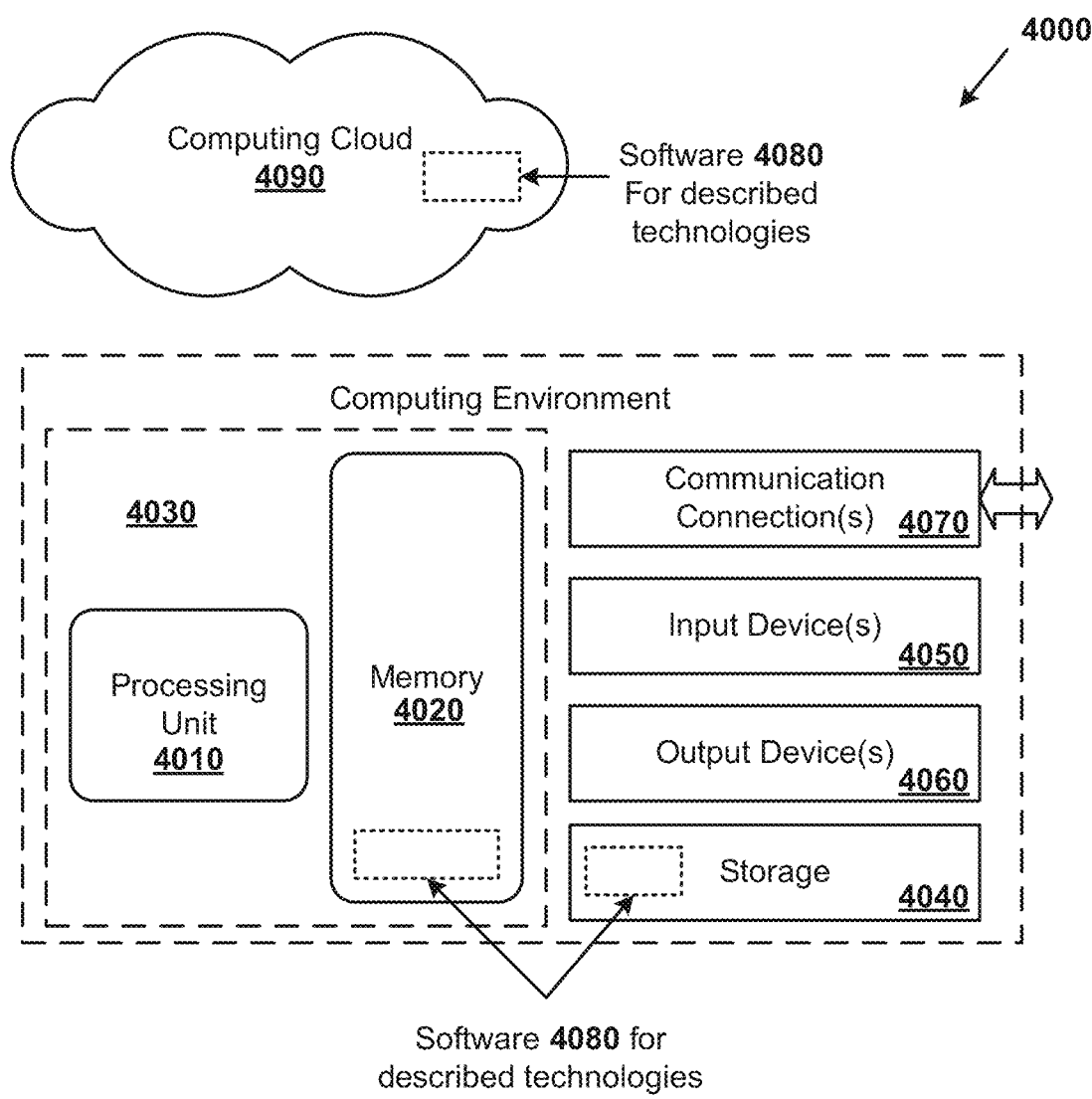
FIG. 40 is a schematic block diagram showing an example computing environment in which embodiments of the disclosed technology can be implemented.

FIG. 40 illustrates a generalized example of a suitable computing environment 4000 in which described embodiments, techniques, and technologies, including parasitic extraction can be implemented. For example, the computing environment 4000 can implement any of the analysis operations, as described herein.

The computing environment 4000 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 40, the computing environment 4000 includes at least one central processing unit 4010 and memory 4020. In FIG. 40, this most basic configuration 4030 is included within a dashed line. The central processing unit 4010 executes computer-executable instructions and may be a real or a virtual processor. In a multi-processing system, multiple processing units execute computer-executable instructions to increase processing power and as such, multiple processors can be running simultaneously. The memory 4020 may be volatile memory (e.g., registers, cache, RAM), non-volatile memory (e.g., ROM, EEPROM, flash memory, etc.), or some combination of the two. The memory 4020 stores software 4080, images, and layout design data that can, for example, implement the technologies described herein. A computing environment may have additional features. For example, the computing environment 4000 includes storage 4040, one or more input devices 4050, one or more output devices 4060, and one or more communication connections 4070. An interconnection mechanism (not shown) such as a bus, a controller, or a network, interconnects the components of the computing environment 4000. Typically, operating system software (not shown) provides an operating environment for other software executing in the computing environment 4000, and coordinates activities of the components of the computing environment 4000.

The storage 4040 may be removable or non-removable, and includes magnetic disks, magnetic tapes or cassettes, CD-ROMs, CD-RWs, DVDs, or any other medium which can be used to store information and that can be accessed within the computing environment 4000. The storage 4040 stores instructions for the software 4080, which can be used to implement technologies described herein.

The input device(s) 4050 may be a touch input device, such as a keyboard, keypad, mouse, touch screen display, pen, or trackball, a voice input device, a scanning device, or another device, that provides input to the computing environment 4000. For audio, the input device(s) 4050 may be a sound card or similar device that accepts audio input in analog or digital form, or a CD-ROM reader that provides audio samples to the computing environment 4000. The output device(s) 4060 may be a display, printer, speaker, CD-writer, or another device that provides output from the computing environment 4000.

The communication connection(s) 4070 enable communication over a communication medium (e.g., a connecting network) to another computing entity. The communication medium conveys information such as computer-executable instructions, compressed graphics information, video, or other data in a modulated data signal. The communication connection(s) 4070 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed computer-executable instructions. In a virtual host environment, the communication(s) connections can be a virtualized network connection provided by the virtual host.

Some embodiments of the disclosed methods can be performed using computer-executable instructions implementing all or a portion of the disclosed technology in a computing cloud 4090. For example, layout design operations can be performed in the computing environment while analysis operations can be performed on servers located in the computing cloud 4090. In some examples, the servers in the computing cloud 4090 are located in a different country or jurisdiction than the computing environment.

Computer-readable media are any available media that can be accessed within a computing environment 4000. By way of example, and not limitation, with the computing environment 4000, computer-readable media include memory 4020 and/or storage 4040. As should be readily understood, the term computer-readable storage media includes the media for data storage such as memory 4020 and storage 4040, and not transmission media such as modulated data signals.

VI. Concluding Remarks

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method, comprising:
by a computing device implementing a parasitic extraction tool configured to compute parasitic effects of a three-dimensional integrated circuit layout design:
computing one or more admittance values between a through-silicon-via ("TSV") structure and an interconnect structure of the three-dimensional integrated circuit layout design using two or more admittance engines, wherein each of the admittance engines is either a field solver or rule-based engine, the two or more admittance engines being different from one another and comprising an electro-static admittance engine and an electro-quasi-static admittance engine; and
generating a netlist representation of the three-dimensional integrated circuit layout design that includes the admittance values.

2. The method of claim 1, wherein the electro-static admittance engine computes admittance values of a portion of the three-dimensional integrated circuit layout design in a dielectric layer and that includes the interconnect structure, and wherein the electro-quasi-static admittance engine computes admittance values of a portion of the three-dimensional integrated circuit layout design in a semiconductive layer that includes a majority of the TSV structure.

3. The method of claim 2, wherein the electro-static admittance engine also accounts for a portion of the TSV structure in the dielectric layer.

4. A method, comprising:
by a computing device implementing a parasitic extraction tool configured to compute parasitic effects of a three-dimensional integrated circuit layout design:
computing one or more admittance values between a through-silicon-via ("TSV") structure and an interconnect structure of the three-dimensional integrated circuit layout design using two or more admittance engines, wherein each of the admittance engines is either a field solver or rule-based engine, the two or more admittance engines being different from one another, wherein the computing comprises generating a projection of the interconnect structure in the dielectric layer at the boundary of the dielectric layer and a semiconductive layer, the projection of the interconnect structure serving as an interface contact between an electro-static admittance engine and an electro-quasi-static admittance engine, and the projection being used during computations of both the electro-static admittance engine and the electro-quasi-static admittance engine; and
generating a netlist representation of the three-dimensional integrated circuit layout design that includes the admittance values.

5. The method of claim 4, wherein the projection is treated as a floating voltage conductor providing for a continuation of voltage between an electro-static portion and an electro-quasi-static portion of the TSV structure and the interconnect structure, and the projection provides an electrical connection between an electro-static netlist and an electro-quasi-static netlist.

6. The method of claim 4, wherein the projection of the interconnect structure is discretized into two or more elements that collectively form the projection of the interconnect, and wherein the two or more discretized elements are represented as volume-less structures.

7. The method of claim 4, wherein the projection of the interconnect structure is represented as a volume-less structure.

8. The method of claim 4, wherein the projection of the interconnect has at least one dimension larger than a corresponding dimension in the interconnect structure, and wherein the larger dimension reduces errors produced by fringe effects.

9. An apparatus, comprising:
a processor;
a memory coupled to the processor; and
one or more computer-readable storage media storing computer-readable instructions that when executed by the processor, cause the processor to:
by a computer implementing a parasitic extraction tool configured to compute parasitic effects in a three-dimensional integrated circuit layout design:
computing one or more admittance values between a through-silicon-via ("TSV") structure and an interconnect structure of the three-dimensional integrated circuit layout design using two or more admittance engines, wherein each of the admittance engines is either a field solver or rule-based engine, the two or more admittance engines being different from one another and comprising an electro-static admittance engine and an electro-quasi-static admittance engine; and
generating a netlist representation of the three-dimensional integrated circuit layout design that includes the admittance values.

10. The apparatus of claim 9, wherein the electro-static admittance engine computes admittance values of a portion of the three-dimensional integrated circuit layout design in a dielectric layer and that includes the interconnect structure, and wherein the electro-quasi-static admittance engine computes admittance values of a portion of the three-dimensional integrated circuit layout design in a semiconductive layer that includes a majority of the TSV structure.

11. An apparatus, comprising:
a processor;
a memory coupled to the processor; and
one or more computer-readable storage media storing computer-readable instructions that when executed by the processor, cause the processor to:
by a computer implementing a parasitic extraction tool configured to compute parasitic effects in a three-dimensional integrated circuit layout design:
computing one or more admittance values between a through-silicon-via ("TSV") structure and an interconnect structure of the three-dimensional integrated circuit layout design using two or more admittance engines, each of the admittance engines is either a field solver or rule-based engine, the two or more admittance engines being different from one another, wherein:
the two or more admittance engines comprise an electro-static admittance engine and an electro-quasi-static admittance engine,
the electro-static admittance engine computes admittance values of a portion of the three-dimensional integrated circuit layout design in a dielectric layer and that includes the interconnect structure, the electro-quasi-static admittance engine computes admittance values of a portion of the three-dimensional integrated circuit layout design in a semiconductive layer that includes a majority of the TSV structure, and wherein the electro-static admittance engine is further configured to generate a projection of the interconnect structure in the dielectric layer at the boundary of the dielectric layer and the semiconductive layer, the projection of the interconnect structure serving as an interface contact between the electro-static admittance engine and the electro-quasi-static admittance engine; and generating a netlist representation of the three-dimensional integrated circuit layout design that includes the admittance values.

12. The apparatus of claim 11, wherein the projection provides for a continuation of voltage between an electro-static portion and an electro-quasi-static portion of the TSV structure and the interconnect structure.

13. The apparatus of claim 11, wherein a projection of the interconnect structure is discretized into two or more elements that collectively form the interconnect, and wherein the two or more discretized elements are represented as volume-less structures.

14. The apparatus of claim 11, wherein the projection of the interconnect structure has at least one dimension larger than a corresponding dimension in the interconnect structure, and wherein the larger dimension reduces errors produced by fringe effects.

15. A computer-readable storage medium storing computer-executable instructions, which when executed by a computer processor, cause the computer processor to:

compute one or more admittance values between a through-silicon-via ("TSV") structure and an interconnect structure of the three-dimensional integrated circuit layout design using two or more admittance engines, wherein each of the admittance engines is either a field solver or rule-based engine, the two or more admittance engines being different from one another and comprising an electro-static admittance engine and an electro-quasi-static admittance engine; and generate a netlist representation of the three-dimensional integrated circuit layout design that includes the admittance values.

16. The computer-readable storage medium of claim 15, and wherein the electro-static admittance engine computes admittance values of a portion of the three-dimensional integrated circuit layout design in a dielectric layer and that includes the interconnect structure, and wherein the electro-quasi-static admittance engine computes admittance values of a portion of the three-dimensional integrated circuit layout design in a semiconductive layer that includes a majority of the TSV structure.

17. A computer-readable storage medium storing computer-executable instructions, which when executed by a computer processor, cause the computer processor to:

compute one or more admittance values between a through-silicon-via ("TSV") structure and an interconnect structure of the three-dimensional integrated circuit layout design using two or more admittance engines, wherein each of the admittance engines is either a field solver or rule-based engine, the two or more admittance engines being different from one another, wherein:

the two or more admittance engines comprise an electro-static admittance engine and an electro-quasi-static admittance engine, the electro-static admittance engine computes admittance values of a portion of the three-dimensional integrated circuit layout design in a dielectric layer and that includes the interconnect structure, the electro-quasi-static admittance engine computes admittance values of a portion of the three-dimensional integrated circuit layout design in a semiconductive layer that includes a majority of the TSV structure, and the electro-static admittance engine is further configured to generate a projection of the interconnect structure in the dielectric layer at the boundary of the dielectric layer and the semiconductive layer, the projection of the interconnect structure serving as an interface contact between an electro-static portion and an electro-quasi-static portion of the TSV structure and the interconnect structure; and generating a netlist representation of the three-dimensional integrated circuit layout design that includes the admittance values.

18. The computer-readable storage medium of claim 17, wherein the projection of the interconnect structure is discretized into two or more elements that collectively form the interconnect, and wherein the two or more discretized elements are represented as volume-less structures.

19. The computer-readable storage medium of claim 17, wherein the projection of the interconnect in the electro-static admittance engine has at least one dimension larger than a corresponding dimension in the interconnect structure, and wherein the larger dimension reduces errors produced by fringe effects.

* * * * *